US009865202B2

(12) United States Patent
Kobayashi et al.

(10) Patent No.: US 9,865,202 B2
(45) Date of Patent: Jan. 9, 2018

(54) LIQUID CRYSTAL DISPLAY DEVICE AND DRIVING METHOD THEREFOR

(71) Applicant: Sharp Kabushiki Kaisha, Osaka-shi, Osaka (JP)

(72) Inventors: Fumiyuki Kobayashi, Osaka (JP); Asahi Yamato, Osaka (JP); Ken Inada, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 15 days.

(21) Appl. No.: 14/779,682

(22) PCT Filed: Feb. 24, 2014

(86) PCT No.: PCT/JP2014/054322
§ 371 (c)(1),
(2) Date: Sep. 24, 2015

(87) PCT Pub. No.: WO2014/162794
PCT Pub. Date: Oct. 9, 2014

(65) Prior Publication Data
US 2016/0063933 A1  Mar. 3, 2016

(30) Foreign Application Priority Data

Apr. 2, 2013  (JP) ................................. 2013-076855

(51) Int. Cl.
G09G 3/36 (2006.01)
G02F 1/1337 (2006.01)
G02F 1/1343 (2006.01)

(52) U.S. Cl.
CPC ......... G09G 3/3607 (2013.01); G09G 3/3614 (2013.01); G09G 3/3648 (2013.01);
(Continued)

(58) Field of Classification Search
CPC ..... G09G 2320/041; G09G 2300/0434; G09G 2320/0247; G09G 2340/16; G09G 3/3614;
(Continued)

(56) References Cited

U.S. PATENT DOCUMENTS

2003/0179175 A1  9/2003  Shigeta et al.
2006/0158415 A1  7/2006  Izumi
(Continued)

FOREIGN PATENT DOCUMENTS

JP  2004-004629 A  1/2004
JP  2006-195231 A  7/2006
(Continued)

OTHER PUBLICATIONS

Official Communication issued in International Patent Application No. PCT/JP2014/054322, dated May 20, 2014.

Primary Examiner — Alexander Eisen
Assistant Examiner — Abhishek Sarma
(74) Attorney, Agent, or Firm — Keating & Bennett, LLP

(57) ABSTRACT

The invention provides a liquid crystal display device capable of preventing a reduction in display quality by suppressing the occurrence of flicker during alternating-voltage drive, as well as a method for driving the same. Overshoot drive is performed during a first frame period, which is shortened to such an extent that a "positive effective area" and a "negative effective area" are approximately equal in size. The duration of the first frame period is set to be greater than or equal to a quarter of one frame period at a refresh rate of 60 Hz but less than one frame period. This renders it possible to make adjustments such that luminance is inhibited from abruptly dropping immediately after a polarity change, and also luminance is prevented from becoming excessively high due to overshoot drive, and
(Continued)

therefore, the occurrence of flicker due to flexoelectric polarization during alternating-voltage drive can be suppressed.

14 Claims, 16 Drawing Sheets

(52) U.S. Cl.
CPC .......... *G02F 1/133707* (2013.01); *G02F 2001/134372* (2013.01); *G02F 2203/30* (2013.01); *G09G 2300/0434* (2013.01); *G09G 2320/0247* (2013.01); *G09G 2320/0252* (2013.01); *G09G 2320/041* (2013.01); *G09G 2340/0435* (2013.01); *G09G 2340/16* (2013.01)

(58) Field of Classification Search
CPC ......... G09G 2320/0252; G09G 3/3607; G09G 3/3648; G09G 2340/0435; G02F 2203/30; G02F 2001/134372; G02F 1/133707
See application file for complete search history.

(56) References Cited

U.S. PATENT DOCUMENTS

| | | | |
|---|---|---|---|
| 2008/0001871 A1* | 1/2008 | Abe | G09G 3/2092 345/87 |
| 2013/0222359 A1 | 8/2013 | Nakata et al. | |
| 2014/0125569 A1* | 5/2014 | Nakata | G09G 3/3648 345/87 |

FOREIGN PATENT DOCUMENTS

| | | |
|---|---|---|
| JP | 2008-009227 A | 1/2008 |
| JP | 2009-168966 A | 7/2009 |
| WO | 2012/057044 A1 | 5/2012 |
| WO | 2013/008668 A1 | 1/2013 |

* cited by examiner

| Current-frame grayscale value \ Previous-frame grayscale value | 0 | 32 | 64 | 96 | 128 | 160 | 192 | 224 | 255 |
|---|---|---|---|---|---|---|---|---|---|
| 0 | 3 | 4 | 5 | 4 | 3 | 3 | 2 | 2 | 1 |
| 32 | 8 | 5 | 6 | 7 | 3 | 3 | 3 | 2 | 2 |
| 64 | 7 | 9 | 4 | 4 | 4 | 4 | 3 | 2 | 2 |
| 96 | 6 | 8 | 9 | 4 | 4 | 4 | 3 | 2 | 3 |
| 128 | 5 | 7 | 5 | 4 | 4 | 4 | 3 | 3 | 3 |
| 160 | 3 | 6 | 5 | 4 | 5 | 3 | 4 | 3 | 2 |
| 192 | 1 | 6 | 4 | 3 | 4 | 4 | 0 | 3 | 1 |
| 224 | 1 | 4 | 4 | 2 | 4 | 4 | 5 | 0 | 1 |
| 255 | 1 | 4 | 3 | 2 | 2 | 1 | 1 | 0 | 0 |

| | Current-frame grayscale value | | | | | | | | |
|---|---|---|---|---|---|---|---|---|---|
| Previous-frame grayscale value | | 0 | 32 | 64 | 96 | 128 | 160 | 192 | 224 | 255 |
| | 0 | | 3 | 4 | 5 | 4 | 3 | 3 | 2 | 2 | 1 |
| | 32 | | 8 | 5 | 6 | 7 | 3 | 3 | 3 | 2 | 2 |
| | 64 | | 7 | 9 | 4 | 4 | 4 | 4 | 3 | 2 | 2 |
| | 96 | | 6 | 8 | 9 | 4 | 4 | 4 | 3 | 2 | 3 |
| | 128 | | 5 | 7 | 5 | 4 | 4 | 4 | 3 | 3 | 3 |
| | 160 | | 3 | 6 | 5 | 4 | 5 | 3 | 4 | 3 | 2 |
| | 192 | | 1 | 6 | 4 | 3 | 4 | 4 | 0 | 3 | 1 |
| | 224 | | 1 | 4 | 4 | 2 | 4 | 4 | 5 | 0 | 1 |
| | 255 | | 1 | 4 | 3 | 2 | 2 | 1 | 1 | 0 | 0 |

FIG. 17

| | | CURRENT-FRAME GRAYSCALE VALUE | | | | | | | | |
|---|---|---|---|---|---|---|---|---|---|---|
| | | 0 | 32 | 64 | 96 | 128 | 160 | 192 | 224 | 255 |
| PREVIOUS-FRAME GRAYSCALE VALUE | 0 | | 4 | 4 | 3 | 3 | 2 | 1 | 1 | 1 |
| | 32 | 2 | | 5 | 4 | 4 | 3 | 3 | 2 | 2 |
| | 64 | 2 | 3 | | 5 | 3 | 3 | 2 | 2 | 2 |
| | 96 | 3 | 3 | 2 | | 2 | 2 | 2 | 2 | 2 |
| | 128 | 2 | 4 | 2 | 2 | | 3 | 2 | 1 | 1 |
| | 160 | 2 | 2 | 2 | 2 | 2 | | 2 | 2 | 1 |
| | 192 | 2 | 2 | 2 | 2 | 2 | 2 | | 3 | 1 |
| | 224 | 1 | 1 | 1 | 1 | 2 | 2 | 0 | | 0 |
| | 255 | 1 | 1 | 1 | 2 | 2 | 1 | 2 | 1 | |

| | | Previous-frame grayscale value | | | | | | | | |
|---|---|---|---|---|---|---|---|---|---|---|
| | | 0 | 32 | 64 | 96 | 128 | 160 | 192 | 224 | 255 |
| Current-frame grayscale value | 0 | | 6 | 6 | 9 | 6 | 6 | 6 | 3 | 3 | 3 |
| | 32 | 12 | | 9 | 9 | 12 | 6 | 6 | 6 | 3 | 3 |
| | 64 | 12 | 15 | | 6 | 6 | 6 | 6 | 6 | 3 | 3 |
| | 96 | 9 | 12 | 15 | | 6 | 6 | 6 | 6 | 3 | 6 |
| | 128 | 9 | 12 | 9 | 6 | | 6 | 6 | 6 | 6 | 6 |
| | 160 | 6 | 9 | 9 | 6 | 9 | | 6 | 6 | 6 | 3 |
| | 192 | 3 | 9 | 6 | 6 | 6 | 6 | | 0 | 6 | 3 |
| | 224 | 3 | 6 | 6 | 3 | 6 | 6 | 9 | | 0 | 3 |
| | 255 | 3 | 6 | 6 | 3 | 3 | 3 | 3 | 0 | | 0 |

LIQUID CRYSTAL DISPLAY DEVICE AND DRIVING METHOD THEREFOR

TECHNICAL FIELD

The present invention relates to liquid crystal display devices and methods for driving the same, particularly to a liquid crystal display device in which alternating-voltage drive is performed and a method for driving the same.

BACKGROUND ART

In the liquid crystal display device, voltages are applied between pixel electrodes and a common electrode, thereby changing the orientation direction (i.e., the longitudinal direction) of liquid crystal molecules, so that an image is displayed on a liquid crystal panel while the amount of light to be transmitted through a liquid crystal layer is controlled.

However, to change the orientation direction of liquid crystal molecules in accordance with the applied voltage, it takes a predetermined period of time after the application of the voltage. For example, in the case of a widely used TN (Twisted Nematic), IPS (In-Plane Switching), FFS (Fringe Field Switching), or VA (Vertically Aligned) liquid crystal display device, it might take a time period of about 50 milliseconds after voltage application to the liquid crystal layer until the orientation direction of liquid crystal molecules changes. In addition, the response speed of the liquid crystal changes in accordance with the temperature, and the response speed decreases as the temperature lowers. Moreover, in the case where the image refresh rate is 60 Hz, one frame period is 16.7 milliseconds. Accordingly, if the response period of the liquid crystal becomes longer than 16.7 milliseconds, image lag might occur on the screen, resulting in reduced display quality. Note that one frame period for a refresh rate of 60 Hz will also be referred to herein as a "normal frame period". Accordingly, the duration of a normal frame period is 16.7 milliseconds.

Therefore, to improve the display speed of the liquid crystal display device, for example, Japanese Laid-Open Patent Publication No. 2004-4629 discloses a liquid crystal display device in which "overshoot drive" is performed to apply a higher voltage to a liquid crystal layer than a voltage corresponding to an image signal. In the overshoot drive, a look-up table (referred to below as an "LUT" or a "table") is used in which correction values are stored and correlated with their respective combinations of grayscale values for the previous and current frames. More specifically, a correction value correlated with a combination of grayscale values for the previous and current frames is read from the LUT, and overshoot drive is performed using a correction image signal obtained by correcting an image signal with the correction value. As a result, it is rendered possible to improve the response speed of the liquid crystal display device.

CITATION LIST

Patent Document

Patent Document 1: Japanese Laid-Open Patent Publication No. 2004-4629

SUMMARY OF THE INVENTION

Problems to be Solved by the Invention

In the liquid crystal display device, if voltages of the same polarity continue to be applied to the liquid crystal layer, burn-in might occur on the liquid crystal layer, resulting in deterioration of the liquid crystal layer. Therefore, to prevent such deterioration of the liquid crystal layer, alternating-voltage drive in which the polarity of a data voltage corresponding to an image signal is inverted upon each writing is performed. However, in some cases where alternating-voltage drive is performed, flicker due to flexoelectric polarization occurs, as will be described later, resulting in reduced display quality. Such flicker occurs in liquid crystal display devices in a transverse electric field mode, such as FFS, more readily than liquid crystal display devices in a vertical electric field mode, such as VA, and further, such flicker is more readily recognizable during pause drive which alternates between a refresh period for image updating and a pause period in which the image updating is paused than during normal drive in which a video is displayed while updating images at a refresh rate of 60 Hz.

Therefore, an objective of the present invention is to provide a liquid crystal display device capable of preventing a reduction in display quality by suppressing the occurrence of flicker due to flexoelectric polarization during alternating-voltage drive, and another objective is to provide a method for driving the same.

Means for Solving the Problems

A first aspect of the present invention is directed to a liquid crystal display device performing alternating-voltage drive, comprising:

a plurality of scanning signal lines formed on an insulating substrate;

a plurality of data signal lines crossing each of the scanning signal lines;

a plurality of pixel forming portions formed at respective intersections of the scanning signal lines and the data signal lines;

a grayscale control portion configured to output either a correction image signal or an image signal, the correction image signal being obtained by subjecting input image data to a grayscale correction process for correcting a temporal signal change, the image signal being the input image data that is not subjected to the grayscale correction process;

a scanning signal line driver circuit configured to sequentially select and scan the scanning signal lines;

a data signal line driver circuit configured to apply either a data voltage or a grayscale correction voltage to the data signal lines, the data voltage being generated in accordance with the image signal and corresponding to a target grayscale value, the grayscale correction voltage being generated by correcting the data voltage in accordance with the correction image signal; and a display control portion configured to control the scanning signal line driver circuit and the data signal line driver circuit, wherein, the display control portion writes the grayscale correction voltage to the pixel forming portions during a first frame period, as well as the data voltage having the same polarity as the grayscale correction voltage during a second frame period, thereby performing control such that screen refresh is performed, and the first frame period has a duration greater than or equal to a quarter of a frame period at a refresh rate of 60 Hz but less than the frame period.

According to a second aspect of the present invention, in the first aspect of the present invention, the second frame period has the same duration as the first frame period.

According to a third aspect of the present invention, in the first aspect of the present invention, the display control portion sets a pause period upon completion of the writing of the data voltage to the pixel forming portions during the second frame period, whereby the writing of the data voltage to the pixel forming portions is paused.

According to a fourth aspect of the present invention, in the first aspect of the present invention, wherein, the grayscale control portion includes:
frame memory having stored the input image data for each frame;
a table having correction values stored corresponding to previous-frame grayscale values and current-frame grayscale values for the input image data;
a comparator circuit configured to obtain a current-frame grayscale value for the input image data and a previous-frame grayscale value for the input image data stored in the frame memory, and output the obtained values to the table; and
an adder circuit configured to output either the correction image signal or the image signal to the data signal line driver circuit in accordance with the input image data,
the table has the correction values stored corresponding to combinations of the current-frame grayscale values and the previous-frame grayscale values for the input image data, and outputs a corresponding correction value from among the combinations to the adder circuit when the comparator circuit provides the table with a current-frame grayscale value and a previous-frame grayscale value for the input image data, and
the adder circuit outputs the correction image signal after correcting the grayscale value for the input image data with the correction value provided by the table, or outputs the image signal without correcting the grayscale value for the input image data.

According to a fifth aspect of the present invention, in the fourth aspect of the present invention, the display control portion includes a drive frequency control circuit configured to, upon acquisition of update information from the comparator circuit indicating that the input image data has not yet been updated, adjust the duration of the first frame period to be less than the duration of the frame period on the basis of the update information.

According to a sixth aspect of the present invention, in the fifth aspect of the present invention, wherein, the update information includes first update information and second update information, the first update information indicating that the input image data has not yet been updated, the second update information indicating that the input image data has been updated, and the display control portion further includes a drive/pause control circuit configured to generate a drive/pause control signal to switch between a drive period and a pause period when the first update information is provided by the comparator circuit or only set a data voltage writing period in which the data voltage is written when the second update information is provided, the drive period consisting of a grayscale correction period in which the grayscale correction voltage is written and the data voltage writing period.

According to a seventh aspect of the present invention, in the fourth aspect of the present invention, further including a temperature sensor configured to measure an ambient temperature around the liquid crystal display device, wherein, the table includes a plurality of subtables having stored different correction values for predetermined temperature ranges, and the table selects from among the subtables one that corresponds to temperature information provided by the temperature sensor in accordance with the temperature information.

According to an eighth aspect of the present invention, in the first aspect of the present invention, the pixel forming portion includes a thin-film transistor being connected at a control terminal to the scanning signal line, at a first conductive terminal to the data signal line, and at a second conductive terminal to a pixel electrode to which the data voltage or the grayscale correction voltage is to be applied, the thin-film transistor having a channel layer formed with an oxide semiconductor.

According to a ninth aspect of the present invention, in the eighth aspect of the present invention, the oxide semiconductor includes indium, gallium, zinc, and oxygen.

According to a tenth aspect of the present invention, in the third aspect of the present invention, the data signal line driver circuit applies a ground potential to the data signal line during the pause period.

According to an eleventh aspect of the present invention, in the third aspect of the present invention, the data signal line driver circuit sets the data signal line at a floating potential during the pause period.

According to a twelfth aspect of the present invention, in the first aspect of the present invention, the insulating substrate has a common electrode and a pixel electrode formed thereon such that one electrode is superimposed over the other electrode with an insulating film positioned therebetween, the overlying electrode having a plurality of openings provided therein.

According to a thirteenth aspect of the present invention, in the first aspect of the present invention, alternating-voltage drive is performed in a dot-by-dot inversion drive mode, a line-by-line inversion drive mode, a column-by-column inversion drive mode, or a frame-by-frame inversion drive mode.

A fourteenth aspect of the present invention is directed to a method for driving a liquid crystal display device configured to display an image represented by input image data on a display portion, including:

a grayscale correction voltage application step for applying a grayscale correction voltage to a liquid crystal layer by writing the grayscale correction voltage to a pixel forming portion during a time period having a duration greater than or equal to a quarter of a frame period at a refresh rate of 60 Hz but less than the frame period, the grayscale correction voltage being obtained by performing a grayscale correction process on a data voltage corresponding to a target grayscale value for the input image data; and a data voltage application step for applying the data voltage to the liquid crystal layer by writing the data voltage to the pixel forming portion without subjecting the data voltage to the grayscale correction process.

According to a fifteenth aspect of the present invention, in the fourteenth aspect of the present invention, in the data voltage application step, the data voltage is applied for a time period having the same duration as the period in which the grayscale correction voltage is applied in the grayscale correction voltage application step.

Effect of the Invention

In the first aspect of the present invention, the grayscale correction process is performed in order to adjust the first frame period such that the "positive effective area" and the "negative effective area" are approximately equal in size during the first frame period. In this grayscale correction process, the duration of the first frame period is set to be greater than or equal to a quarter of one frame period at a refresh rate of 60 Hz but less than one frame period. This renders it possible to make adjustments such that luminance is inhibited from abruptly dropping immediately after a polarity change, and also luminance is prevented from becoming excessively high or low due to the grayscale correction process, and therefore, the occurrence of flicker due to flexoelectric polarization during alternating-voltage drive can be suppressed. Thus, the image display quality of the liquid crystal display device can be enhanced to such an extent that the viewer barely notices flicker.

In the second aspect of the present invention, each drive period is set such that the second frame period in which to write the data voltage has the same duration as the first frame period in which to write the grayscale correction voltage. Accordingly, for any pixel forming portions within one screen, it is possible to render constant the time taken from the writing of a grayscale correction voltage to the writing of a data voltage, i.e., the time taken from the start to the end of the writing of the grayscale correction voltage can be equalized among all pixel forming portions. Thus, the size of the "positive effective area" is the same among the pixel forming portions, so that the occurrence of uneven flicker distribution due to flexoelectric polarization during alternating-voltage drive can be suppressed.

In the third aspect of the present invention, the pause period is set after the end of the writing of the grayscale correction voltage and the data voltage. Thus, flicker due to flexoelectric polarization, which is readily recognizable during pause drive for which the refresh rate is low, can be suppressed.

In the fourth aspect of the present invention, the adder circuit provided in the grayscale control portion performs the grayscale correction process by outputting a correction image signal, which is obtained by correcting the grayscale value of input image data with a correction value provided by the table, and thereafter, outputting an image signal without correcting the grayscale value of the input image data. As a result, the grayscale correction voltage can be written before a data voltage generated on the basis of the image signal and corresponding to a target grayscale value is written to the pixel forming portion, so that the occurrence of flicker due to flexoelectric polarization during alternating-voltage drive can be suppressed.

In the fifth aspect of the present invention, upon acquisition of the update information from the comparator circuit indicating that the input image data has not yet been updated, the drive frequency control circuit included in the display control portion shortens the duration of the first frame period in which to write the grayscale correction voltage to the pixel forming portion. As a result, the writing of the grayscale correction voltage ends before the luminance of the pixel forming portion becomes excessively high, so that the occurrence of flicker due to flexoelectric polarization during alternating-voltage drive can be suppressed.

In the sixth aspect of the present invention, when the first update information indicating that the input image data has not been updated is provided, the drive/pause control circuit included in the display control portion switches between the drive period, which consists of the grayscale correction period and the data voltage writing period, and the pause period, and when the second update information indicating that the input image data has been updated is provided, the drive/pause control circuit generates a drive/pause control signal to provide an instruction to set only the data voltage writing period. In this case, the display control portion generates and outputs a drive/pause signal to provide an instruction to, when the input image data has been updated, write a data voltage during a period having the same duration as a normal frame period, or, when the input image data has not yet been updated, write each of the grayscale correction period and the data voltage writing period in a period shorter than a normal frame period. As a result, the drive/pause control circuit can output a drive/pause control signal for normal drive or pause drive to the data signal line driver circuit on the basis of the input image data.

In the seventh aspect of the present invention, the temperature sensor and the subtables having correction values stored for different temperatures are provided, such that the grayscale correction process is performed by selecting one of the subtables in accordance with the temperature of the environment in which the liquid crystal display device is used. Thus, for liquid crystal display devices to be used in a wide temperature range, luminance adjustments can be made such that luminance becomes optimum regardless of the temperature when the grayscale correction voltage is written, making it possible to suppress the occurrence of flicker due to flexoelectric polarization during alternating-voltage drive.

In the eighth aspect of the present invention, as the switching element of each pixel forming portion, a thin-film transistor whose channel layer is formed with an oxide semiconductor is used. This renders it possible to reduce off-leakage current of the thin-film transistor significantly, so that the voltage written in the pixel capacitor of the pixel forming portion can be retained for a long period of time. Further, in the case where pause drive is performed, power consumption for image display can be reduced significantly.

In the ninth aspect of the present invention, the oxide semiconductor with which the channel layer of the thin-film transistor included in the pixel forming portion is formed includes indium, gallium, zinc, and oxygen, so that the effect of the eighth aspect of the invention can be reliably achieved.

In the tenth aspect of the present invention, the potential of the data signal line is set at a ground potential during the pause period. Thus, the potential of the data signal line is fixed, so that an erroneous operation due to noise can be prevented.

In the eleventh aspect of the present invention, the operation of the data signal line driver circuit is stopped during the pause period, thereby setting the data signal line at a floating potential. Thus, power consumption of the data signal line driver circuit can be reduced.

In the twelfth aspect of the present invention, the occurrence of flicker due to flexoelectric polarization during alternating-voltage drive can be suppressed even in FFS liquid crystal display devices, which are prone to such flicker.

The thirteenth aspect of the present invention allows the occurrence of flicker to be suppressed when the liquid crystal display devices according to any of the first to twelfth aspects of the invention are driven in any of the alternating-voltage drive modes: dot-by-dot inversion drive; line-by-line inversion drive; column-by-column inversion drive; and frame-by-frame inversion drive.

The effect of the fourteenth aspect of the present invention is apparent from the descriptions of the effect of the first aspect of the invention and embodiments to be delineated below, and therefore, any description thereof will be omitted.

The effect of the fifteenth aspect of the present invention is apparent from the descriptions of the effect of the second aspect and the embodiments to be delineated below, and therefore, any description thereof will be omitted.

BRIEF DESCRIPTION OF THE DRAWINGS

FIG. 9 is a diagram illustrating an example of the configuration of an LUT used in the liquid crystal display device shown in FIG. 7.

FIG. 16 is a diagram showing an example of an LUT for normal temperature used in the liquid crystal display device shown in FIG. 14.

FIG. 17 is a diagram showing an example of an LUT for high temperature used in the liquid crystal display device shown in FIG. 14.

FIG. 18 is a diagram showing an example of an LUT for low temperature used in the liquid crystal display device shown in FIG. 14.

MODES FOR CARRYING OUT THE INVENTION

>1. Basic Studies>
<1.1 Cause of Flicker>

The modes of driving the liquid crystal display device include the vertical electric field mode, such as VA, in which a voltage is applied vertically to an insulating substrate and the transverse electric field mode, such as IPS and FFS, in which a voltage is applied approximately parallel to an insulating substrate. In the case of the transverse electric field mode, unlike in the case of the vertical electric field mode, a common electrode, along with pixel electrodes, is formed on one insulating substrate (array substrate) in order to generate an electric field approximately parallel to the other insulating substrate. By applying voltages between the pixel electrodes and the common electrode, liquid crystal molecules rotate within a plane parallel to the insulating substrate and are oriented in the direction of the electric field. Such a liquid crystal display device employing the transverse electric field mode has superior viewing angle characteristics compared to the liquid crystal display device employing the vertical electric field mode. Particularly, the FFS liquid crystal panel is a panel developed for solving problems with the IPS liquid crystal panel, such as low aperture ratio and low transmittance, and such a mode is also called an oblique electric field mode.

Figure 1:
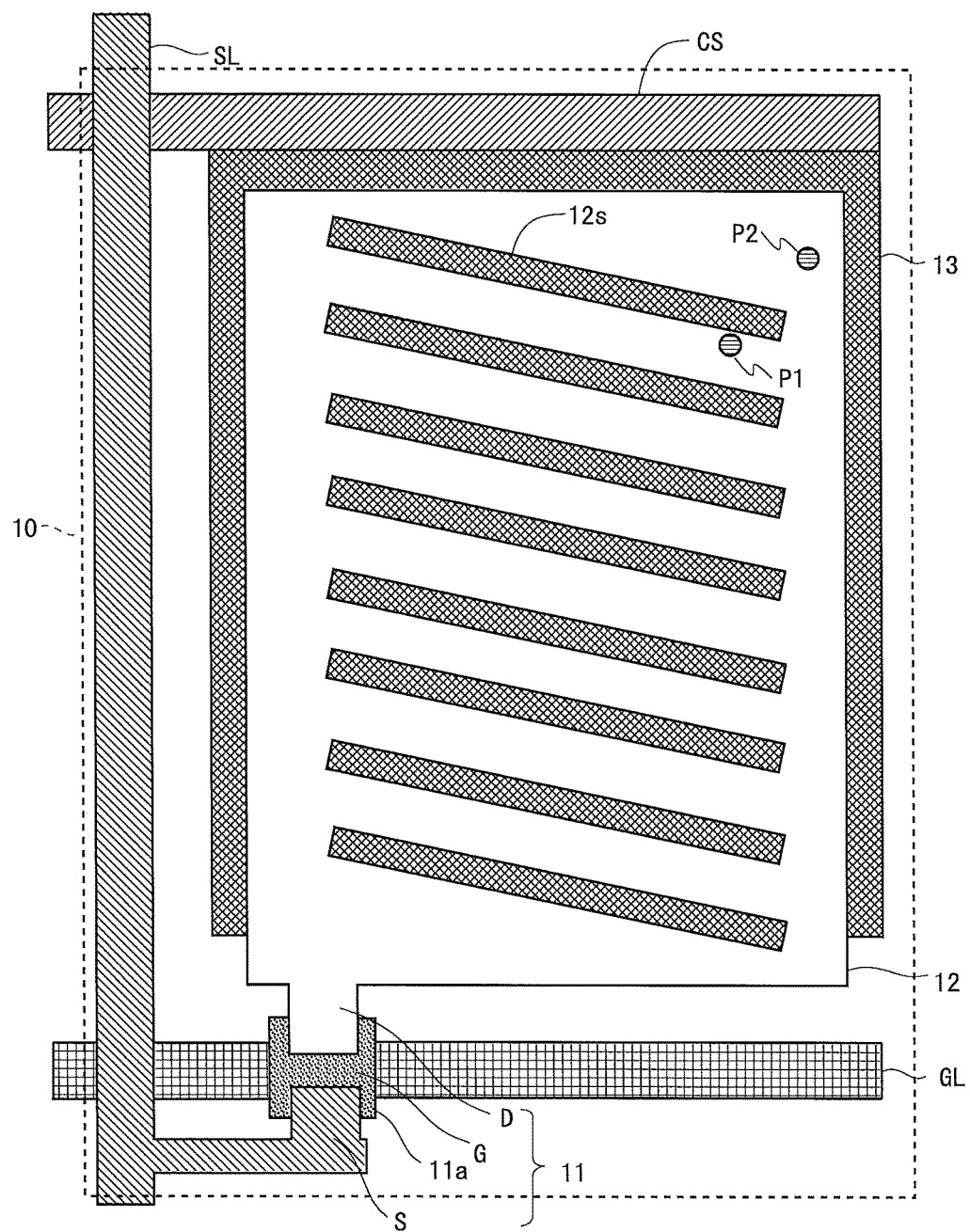
FIG. 1 is a plan view of a pixel forming portion formed on an array substrate included in an FFS liquid crystal panel.
Figure 2:
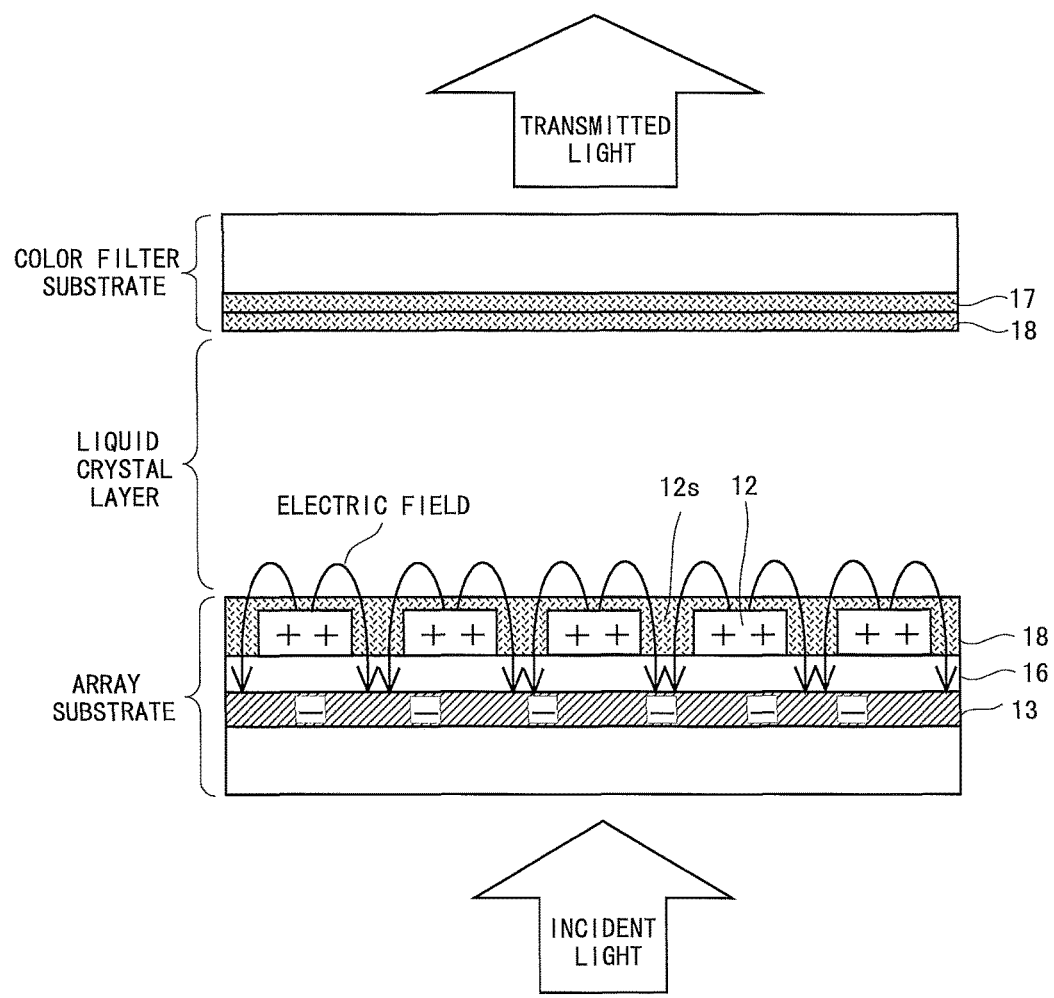
FIG. 2 is a cross-sectional view of the FFS liquid crystal panel shown in FIG. 1.

The configuration and the operation of the FFS liquid crystal panel will be described. FIG. 1 is a plan view of a pixel forming portion 10 formed on an array substrate included in the FFS liquid crystal panel, and FIG. 2 is a cross-sectional view of the FFS liquid crystal panel shown in FIG. 1. As shown in FIGS. 1 and 2, the FFS liquid crystal panel includes the array substrate and a color filter substrate. The array substrate has scanning signal lines GL and common lines CS, which are formed parallel to each other, and also has data signal lines SL formed perpendicularly to the scanning signal lines GL and the common lines CS. Formed on the insulating substrate is a common electrode 13 covering the most part of the pixel forming portion 10 and electrically connected to the common line CS. There is a pixel electrode 12 superimposed over the top surface of the common electrode 13 with an insulating film 16 positioned therebetween, and the pixel electrode 12 has a plurality of openings (slits) 12s provided in stripes.

Formed near the intersection of the scanning signal line GL and the data signal line SL is a thin-film transistor (TFT) 11 functioning as a switching element. There is disposed a semiconductor layer (channel layer) 11a on the surface of the scanning signal line GL, such that a part of the data signal line SL extends as a source electrode S covering a part of the top surface of the semiconductor layer 11a, a portion of the scanning signal line GL that is located below the semiconductor layer 11a acts as a gate electrode G, and a part of the pixel electrode 12 that overlaps the semiconductor layer 11a acts as a drain electrode D.

Formed on the pixel electrode 12 is an alignment film 18 oriented in a predetermined direction. On the other hand, there are a color filter layer 17 and another alignment film 18 formed sequentially on the surface of the color filter substrate. The array substrate and the color filter substrate are arranged such that the alignment films 18 face each other, and there is a liquid crystal layer sandwiched between the substrates.

In this liquid crystal panel, when voltages are applied between the pixel electrodes 12 and the common electrode 13, electric fields are formed so as to be directed toward the common electrode 13 from opposite sides of the pixel electrodes 12. As a result, not only liquid crystal molecules between the pixel electrodes 12 but also liquid crystal molecules above the pixel electrodes 12 are oriented in the same direction as the electric fields. Accordingly, the FFS liquid crystal panel offers higher contrast with wider viewing angles than the IPS liquid crystal panel, and also is characterized by being bright because of its high transmittance, but it has a problem of being prone to flicker. Note that the array substrate and the color filter substrate have their respective polarizers attached thereto, but any illustrations and descriptions of the polarizers are omitted.

Described next is the mechanism by which flicker is caused to occur readily when alternating-voltage drive is performed on the FFS liquid crystal panel. Liquid crystal molecules in the liquid crystal panel tend to be oriented in the same direction as the electric fields. On the other hand, the force of alignment regulation by the alignment film 18 acts to fix the orientation direction of the liquid crystal molecules to the rubbing direction of the alignment film 18. If such a force causes the orientation direction of the liquid crystal molecules to change abruptly, the resultant polarization (i.e., flexoelectric polarization) emerges without being cancelled out. The flexoelectric polarization in itself responds to the electric field, thereby causing alignment deformation of the liquid crystal molecules, which is superimposed on alignment deformation caused by dielectric anisotropy. As a result, the phenomenon where light transmittance changes due to flexoelectric polarization can be seen in the vicinity of the slits 12s of the pixel electrodes 12. This phenomenon results in different light transmittance values within the same pixel forming portion 10 between area P1 (referred to below as "first area P1") close to the slit 12s of the pixel electrode 12 and area P2 (referred to below as "second area P2") distant from the slit 12s. In this manner, there are areas with different luminances within the same pixel forming portion 10, and such a luminance difference between the areas causes flicker to occur.

Note that in the foregoing, the common electrode has been described as a lower electrode and the pixel electrode has been described as an upper electrode, but the pixel electrode may be a lower electrode and the common electrode may be an upper electrode. In such a case, the slits are formed in the common electrode, which is the upper electrode. In addition, the light transmittance change due to flexoelectric polarization occurs conspicuously in the FFS liquid crystal panel, but such a change can also be seen in the IPS liquid crystal panel.

<1.2 First Basic Study>

Figure 3:
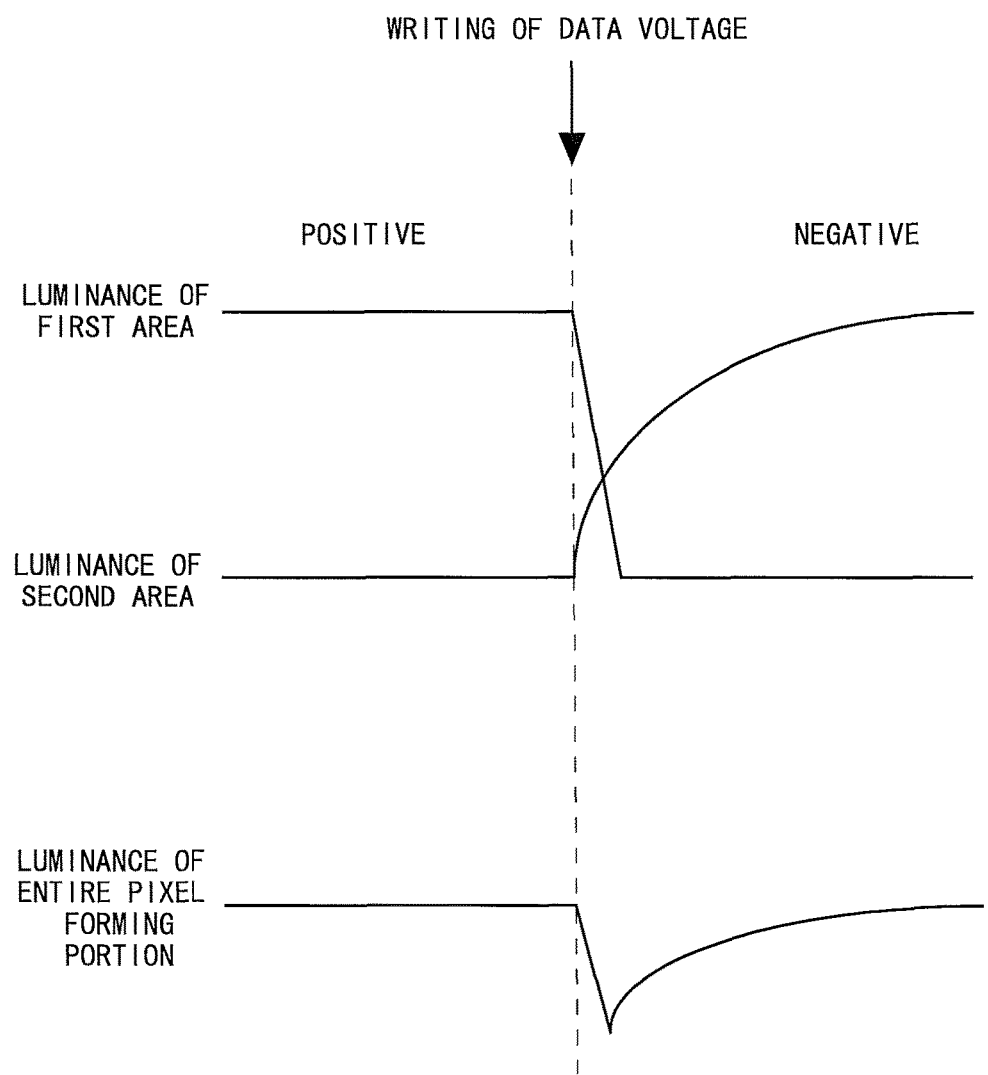
FIG. 3 is a diagram illustrating luminance changes within a pixel forming portion in a first basic study where the polarity of an image signal changes from positive to negative.

The luminance change due to flexoelectric polarization within the same pixel forming portion 10 will be described. FIG. 3 is a diagram illustrating luminance changes within a pixel forming portion 10 in a first basic study where the polarity of a data voltage corresponding to a target grayscale value for an image signal (referred to below simply as a "data voltage") changes from positive to negative. As described above, the pixel forming portion 10 has two areas whose luminances are different in accordance with the distance from the slit 12s. As a result of a positive image signal being written to the pixel forming portion, the luminance of first area P1 close to the slit 12s becomes higher than that of second area P2 distant from the slit 12s.

Next, when a negative data voltage is written, the luminance of second area P2 keeps rising slowly. However, the luminance of first area P1 drops abruptly, and is maintained at a constant value thereafter. In this case, the viewer sees the luminance changes in first and second areas P1 and P2 simultaneously. Accordingly, the luminance visually recognized by the viewer abruptly drops immediately after the change from positive to negative. Therefore, the viewer visually recognizes the luminance drop as flicker.

As for the FFS liquid crystal display device, such flicker is a phenomenon that can be seen even in the case of normal drive where a video is displayed at a refresh rate of 60 Hz, but since the refresh rate of 60 Hz is high, the viewer is barely bothered by the occurrence of flicker. On the other hand, in the case where pause drive is performed, the refresh rate is low, and therefore, the occurrence of flicker is noticeable.

<1.3 Second Basic Study>

In the first basic study, when the polarity of the data voltage changes from positive to negative, the speed of the luminance change from low to high in second area P2 is slow compared to the speed of the luminance change from high to low in first area P1, resulting in the problem where the luminance drops significantly, immediately after the polarity change of the data voltage. Therefore, conceivably, the occurrence of flicker can be suppressed if it is possible to inhibit the abrupt luminance drop in first area P1 immediately after the polarity change of the data voltage during alternating-voltage drive.

Figure 4:
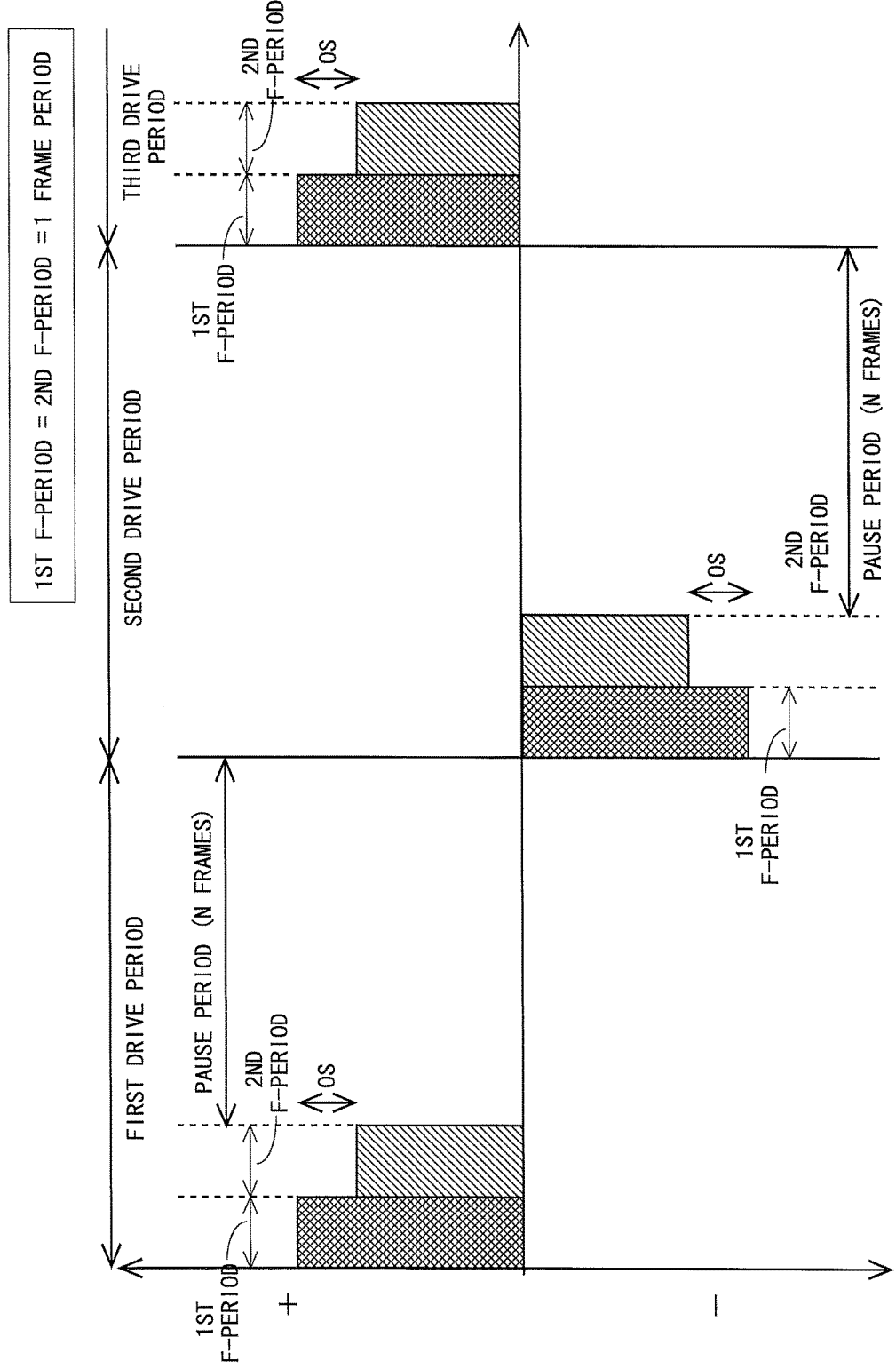
FIG. 4 is a timing chart illustrating a method for driving a liquid crystal display device to be carried out in a second basic study.

FIG. 4 is a timing chart illustrating a method for driving the liquid crystal display device to be discussed in the second basic study. As shown in FIG. 4, an overshoot voltage (OS) having a higher voltage value than a data voltage is written in a first frame period (i.e., a first F-period) every drive period. Next, the data voltage is written in a second frame period (i.e., a second F-period). Thereafter, a pause period is provided by inserting a pause frame period equivalent to N frame periods.

Figure 5:
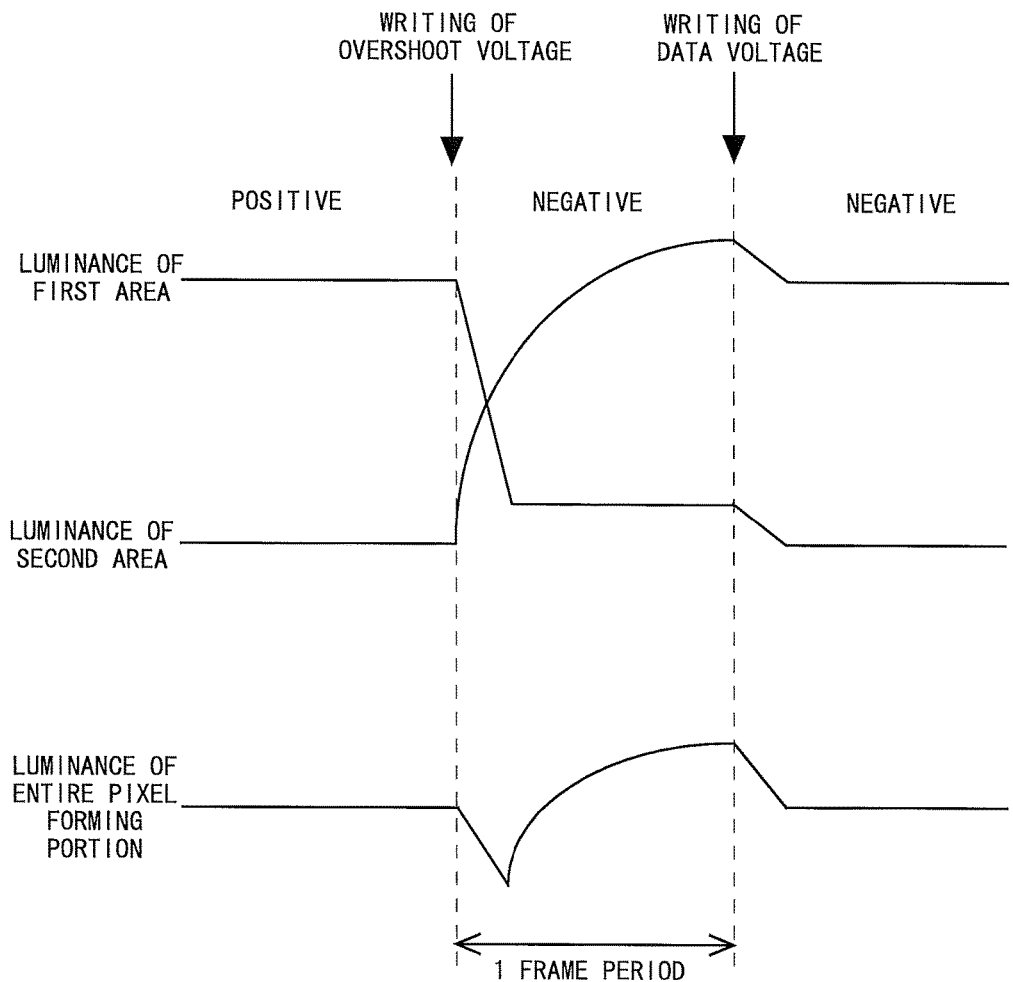
FIG. 5 is a diagram illustrating luminance changes within a pixel forming portion in the second basic study where the polarity of an image signal changes from positive to negative.

FIG. 5 is a diagram illustrating luminance changes within a pixel forming portion 10 in the second basic study where the polarity of a data voltage changes from positive to negative. As shown in FIG. 5, before the polarity of the data voltage changes from positive to negative, a negative overshoot voltage is initially written for one frame period, and a negative data voltage is written for the next frame period.

FIG. 5 only shows the case where the polarity of the data voltage changes from positive to negative. However, also in the case where the polarity of the data voltage changes from negative to positive, a positive overshoot voltage is initially written for one frame period, and a data voltage is written for the next frame period. Thereafter, the operation of writing an overshoot voltage for one frame period and a data voltage for the next frame period will be repeated similarly while changing the polarity.

Luminance changes in first area P1 and second area P2 which occur when the polarity of a data voltage changes from positive to negative will be described. In the case where the polarity of a data voltage changes from positive to negative when the luminance of first area P1 is higher than that of second area P2, a negative overshoot voltage is written for a frame period immediately before the data voltage is written (i.e., a first frame period). As a result, the luminance of second area P2 rises abruptly from low to high. At the same time, the luminance of first area P1 drops abruptly from high to a value determined by the overshoot voltage, and thereafter, remains at the value.

The data voltage is written for the next frame period (i.e., a second frame period). As a result, the luminance of second area P2, which has risen excessively due to overshoot drive, drops to a value corresponding to the data voltage, and is maintained constant at the value. On the other hand, the luminance of first area P1, which has risen due to overshoot drive during the first frame period, drops to a value determined by the data voltage, and is maintained constant at the value.

In this manner, by performing overshoot drive during the first frame period, it is rendered possible to inhibit the luminance of first area P1 from abruptly dropping immediately after the polarity change, and also to improve the liquid crystal response speed in second area P2. This lessens the abrupt luminance drop caused immediately after the polarity change of the data voltage.

Figure 6:
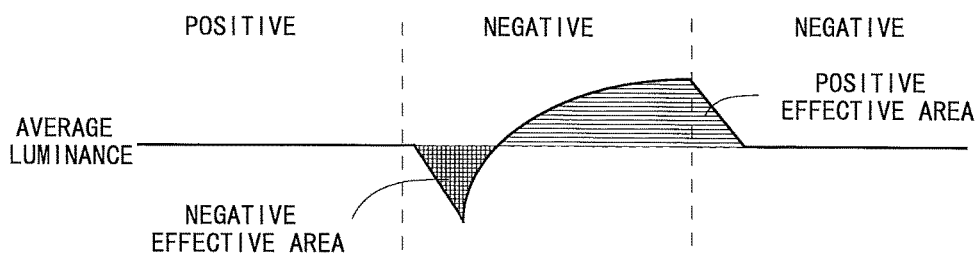
FIG. 6 is a diagram describing the reason why flicker occurs when drive is performed by the drive method shown in FIG. 4.

FIG. 6 is a diagram describing the reason why flicker occurs when drive is performed by the drive method shown in FIG. 4. As shown in FIG. 6, overshoot drive is performed during the first frame period, so that an abrupt luminance drop still occurs immediately after a polarity change but to a lesser extent compared to the first basic study shown in FIG. 3. However, overshoot drive results in the size of an area with a higher luminance than an average luminance (referred to below as a "positive effective area") being larger than the size of an area with a lower luminance than the average luminance (referred to below as a "negative effective area"). Such an unbalance in size between the positive effective area and the negative effective area is due to the luminance of second area P2 being excessively high. Such an increase in the size of the "positive effective area" is conceivably the cause of flicker.

As the results of the first and second basic studies suggest, to suppress the occurrence of flicker immediately after a polarity change of the data voltage, it is insufficient to set an overshoot drive period of one frame for application of an overshoot voltage higher than the data voltage immediately after the polarity change of the data voltage, and further, it is necessary to set the overshoot voltage at a voltage value which causes the "positive effective area" and the "negative effective area" to be approximately equal in size.

Embodiments of the present invention, which has been devised on the basis of the first and second basic studies in order to suppress the occurrence of flicker due to flexoelectric polarization, will be described below.

<2. First Embodiment>

In the following descriptions, pause drive refers to drive which alternates between a drive period for screen refresh and a pause period for pausing the refresh, and normal drive refers to drive which only involves drive periods but no pause periods. Moreover, as will be described later, the drive period for pause drive includes an overshoot drive period and a data voltage writing period in which to write a data voltage in accordance with image data, whereas the drive period for normal drive only includes a data voltage writing period. Furthermore, "one frame period" is a period required for refreshing one screen, and in each embodiment to be described below, the duration of "one frame period" is 16.7 milliseconds, which is equivalent to the duration of one frame period where the refresh rate is 60 Hz, but the present invention is not limited to this.

<2.1 Overall Configuration and Summary of Operation>

Figure 7:
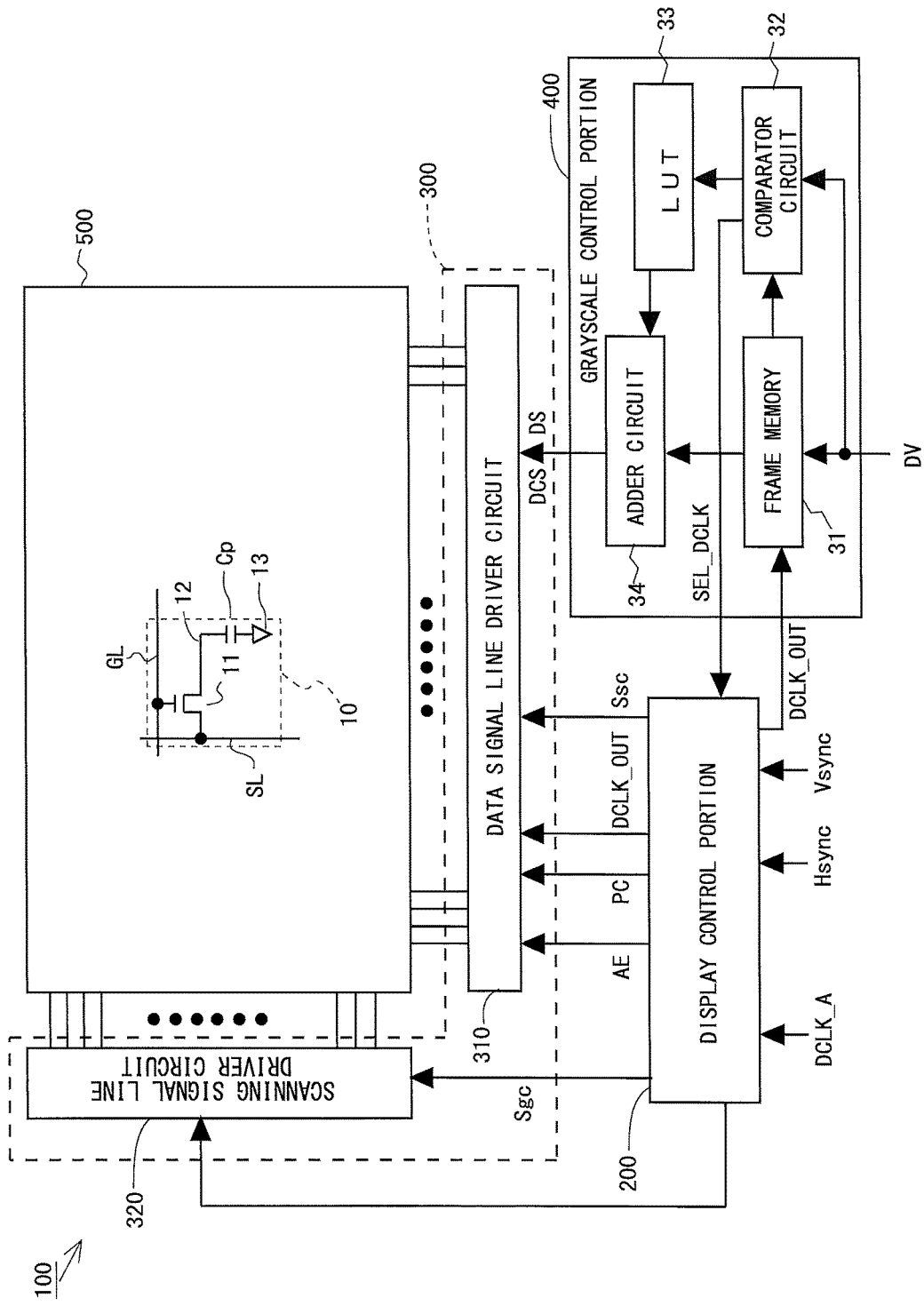
FIG. 7 is a block diagram illustrating the configuration of a liquid crystal display device according to a first embodiment of the present invention.

FIG. 7 is a block diagram illustrating the configuration of a liquid crystal display device 100 according to the present embodiment. The liquid crystal display device 100 includes a display control portion 200, a drive portion 300, a gray-scale control portion 400, and a display portion 500. The drive portion 300 includes a data signal line driver circuit 310 and a scanning signal line driver circuit 320. The display portion 500 is included in a liquid crystal panel. The liquid crystal panel may be configured such that the display portion 500 is integrally formed with either or both of the data signal line driver circuit 310 and the scanning signal line driver circuit 320. Provided outside the liquid crystal display device 100 is a host (not shown) mainly composed of a CPU (Central Processing Unit), and the host transmits data, including image data DV (also referred to as "input image data"), which represents an image to be displayed on the display portion 500, to the liquid crystal display device 100.

Formed on the display portion 500 are a plurality of data signal lines SL, a plurality of scanning signal lines GL, a plurality of common lines (not shown), and a plurality of pixel forming portions 10 arranged in a matrix corresponding to their respective intersections of the data signal lines SL and the scanning signal lines GL. For the sake of convenience, FIG. 7 only shows one pixel forming portion 10 as well as one data signal line SL and one scanning signal line GL, each being connected to the pixel forming portion 10.

The pixel forming portion 10 includes a thin-film transistor (TFT) 11, which is connected at a gate terminal (also referred to as a "control terminal") to its corresponding scanning signal line GL and at a source terminal (also referred to as a "first conductive terminal") to its corresponding data signal line SL and functions as a switching element, a pixel electrode 12 connected to a drain terminal (also referred to as a "second conductive terminal") of the TFT 11, a common electrode 13 provided commonly for the pixel forming portions 10, and a liquid crystal layer (not shown) provided commonly for the pixel forming portions 10 between two substrates included in the liquid crystal panel, i.e., an array substrate and a color filter substrate (neither of which is shown). The pixel electrode 12, the common electrode 13, and an insulating film 16 sandwiched therebetween constitute a pixel capacitor Cp. The common electrodes 13 of the pixel forming portions 10 are connected to one another via the unillustrated common lines. Note that the arrangement of the TFT 11, the pixel electrode 12, the common electrode 13, etc., in each pixel forming portion 10 is the same as in the FFS pixel panel shown in FIGS. 1 and 2, and therefore, any description thereof will be omitted.

Furthermore, as the TFT 11 included in each pixel forming portion 10, a TFT whose channel layer is made with, for example, an oxide semiconductor is used. More specifically, the channel layer of the TFT 11 is formed using In—Ga—Zn—O (indium gallium zinc oxide) consisting of indium (In), gallium (Ga), zinc (Zn), and oxygen (O). The TFT whose channel layer is made with In—Ga—Zn—O reduces off-leakage current significantly compared to silicon-based TFTs whose channel layers are made with amorphous silicon or suchlike. Accordingly, a voltage written in the pixel capacitor Cp of each pixel forming portion 10 is maintained for a long period of time. Note that similar effects can be achieved even in the case where an oxide semiconductor other than In—Ga—Zn—O is used as the channel layer, e.g., an oxide semiconductor including at least one of the following: indium, gallium, zinc, copper (Cu), silicon (Si), tin (Sn), aluminum (Al), calcium (Ca), germanium (Ge), and lead (Pb).

The display control portion 200 is realized typically as an IC (integrated circuit), as will be described in detail later in conjunction with the configuration thereof. The display control portion 200 receives a vertical synchronization signal Vsync and a horizontal synchronization signal Hsync, which are required for displaying an image to be displayed, from the host, and then, in accordance with these signals, the display control portion 200 generates a data signal line driver circuit control signal Ssc, a scanning signal line driver circuit control signal Sgc, a common voltage signal (not shown), etc. The data signal line driver circuit control signal Ssc is supplied to the data signal line driver circuit 310, the scanning signal line driver circuit control signal Sgc is supplied to the scanning signal line driver circuit 320, and the common voltage signal is supplied to the common electrode 13 provided in the display portion 500. In addition, the display control portion 200 generates an amp enable signal (also referred to as a "drive/pause control signal") AE for switching between normal drive and pause drive or switching between a drive period and a pause period during pause drive, a polarity control signal PC for switching the polarity of a data voltage from positive to negative or from negative to positive, and a dot clock output signal DCLK_OUT to be described later, and the display control portion 200 supplies these signals to the data signal line driver circuit 310.

The grayscale control portion 400, as with the display control portion 200, is realized typically as an IC, as will be described in detail later in conjunction with the configuration thereof. The grayscale control portion 400 outputs image data DV, which is transmitted by the host, to the data signal line driver circuit 310 as an image signal DS, and the grayscale control portion 400 also corrects a grayscale value specified by the image data DV, thereby generating a correction image signal DCS with a high grayscale value, and outputs the signal to the data signal line driver circuit 310.

The data signal line driver circuit control signal Ssc supplied to the data signal line driver circuit 310 includes, for example, a source start pulse signal, a source clock signal, and a latch strobe signal. The data signal line driver circuit 310 causes unillustrated internal components, such as a shift register and a sampling latch circuit, to operate in accordance with the data signal line driver circuit control signal Ssc, and applies the image signal DS and the correction image signal DCS, which are supplied from the grayscale control portion 400, to the data signal lines SL after conversion to analog signals, which are respectively a data voltage and an overshoot voltage, through an unillustrated DA conversion circuit.

The scanning signal line driver circuit 320 repeats applying active scanning signals to the scanning signal lines GL in predetermined cycles in accordance with the scanning signal line driver circuit control signal Sgc. The scanning signal line driver circuit control signal Sgc includes, for example, a gate clock signal and a gate start pulse signal. The scanning signal line driver circuit 320 causes unillustrated internal components, such as a shift register, to operate in accordance with the gate clock signal and the gate start pulse signal, thereby generating scanning signals, and applies the signals to the scanning signal lines GL.

The display portion 500 has a backlight unit (not shown) provided at the back, and the backlight unit illuminates the display portion 500 with backlight from the backside. The backlight unit may be controlled by the display control portion 200 or may be controlled by another method. Note that in the case where the liquid crystal panel is of a reflective type, there is no need to provide the backlight unit.

In this manner, the scanning signals are applied to the scanning signal lines GL, the overshoot voltage and the data voltage are applied sequentially to the data signal lines SL, and the backlight unit is driven so that the image represented by the image data DV transmitted by the host is displayed on the display portion 500 of the liquid crystal panel.

<2.2 Configuration of the Display Control Portion>

Figure 8:
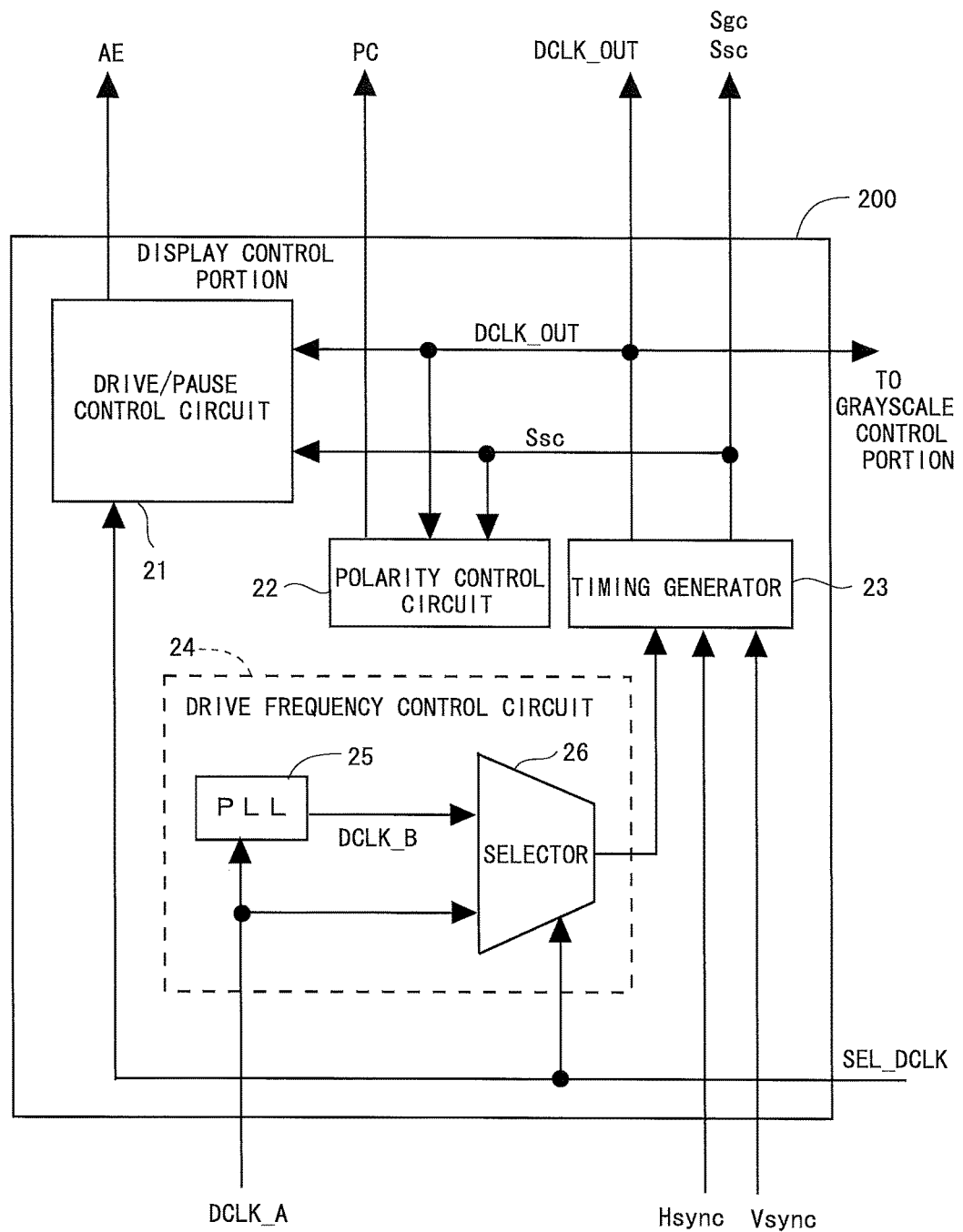
FIG. 8 is a block diagram illustrating the configuration of a display control portion included in the liquid crystal display device shown in FIG. 7.

FIG. 8 is a block diagram illustrating the configuration of the display control portion 200 included in the liquid crystal display device 100 according to the present embodiment. As shown in FIG. 8, the display control portion 200 includes a drive/pause control circuit 21, a polarity control circuit 22, a timing generator 23, and a drive frequency control circuit 24, and the drive frequency control circuit 24 includes a PLL (phase locked loop) circuit 25 and a selector 26. The display control portion 200 is supplied with signals from the host, such as a first dot clock signal DCLK_A and synchronization signals Hsync and Vsync, and also supplied with a dot clock selection signal SEL_DCLK (referred to in some cases as "update information") from the grayscale control portion 400. The dot clock selection signal SEL_DCLK includes information which specifies either pause drive or normal drive, along with information which specifies the speed of transmitting image data DV (i.e., a clock rate) required for the drive.

Once the host supplies the selector 26 and the PLL circuit 25 with the first dot clock signal DCLK_A, which specifies the speed of transmitting the image data DV, the PLL circuit 25 generates a second dot clock signal DCLK_B, which specifies image data transmission speeds for an overshoot drive period (also referred to as a "first frame period") and a data voltage writing period (also referred to as a "second frame period"), on the basis of the first dot clock signal DCLK_A, and provides the signal to the selector 26. In this case, the clock rate specified by the second dot clock signal DCLK_B is faster than the clock rate specified by the first dot clock signal DCLK_A, and therefore, the duration of one frame period is shorter in the case where the second dot clock signal DCLK_B is provided than in the case where the first dot clock signal DCLK_A is provided. In this manner, the duration of one frame period can be changed depending on whether the data signal line driver circuit 310 is provided with the first dot clock signal DCLK_A or the second dot clock signal DCLK_B.

The selector 26 selects either the first dot clock signal DCLK_A or the second dot clock signal DCLK_B in accordance with the dot clock selection signal SEL_DCLK provided by the grayscale control portion 400, and outputs the selected signal to the timing generator 23. More specifically, the selector 26 selects and outputs the first dot clock signal DCLK_A in the case where normal drive is performed in accordance with the dot clock selection signal SEL_DCLK or selects and outputs the second dot clock signal DCLK_B in the case where pause drive is performed. The first or second dot clock signal DCLK_A or DCLK_B selected and outputted by the selector 26 in the above manner is referred to as the dot clock output signal DCLK_OUT. Note that the present invention achieves considerable effects upon application to pause drive, and therefore, the case where the invention is applied to pause drive will be described in detail below while a supplementary description will be given regarding the case where the invention is applied to normal drive.

Once the timing generator 23 is supplied with a horizontal synchronization signal Hsync and a vertical synchronization signal Vsync as synchronization signals for the image data DV from the host, the timing generator 23 generates a data signal line driver circuit control signal Ssc and a scanning signal line driver circuit control signal Sgc on the basis of the synchronization signals Hsync and Vsync, and supplies the data signal line driver circuit control signal Ssc to the data signal line driver circuit 310, the drive/pause control circuit 21, and the polarity control circuit 22 and also supplies the scanning signal line driver circuit control signal Sgc to the scanning signal line driver circuit 320. Moreover, the timing generator 23 supplies the dot clock output signal DCLK_OUT provided by the selector 26 to the data signal line driver circuit 310, the drive/pause control circuit 21, the polarity control circuit 22, and frame memory 31 of the grayscale control portion 400 to be described later.

On the basis of the dot clock selection signal SEL_DCLK provided by the grayscale control portion 400, as well as the dot clock output signal DCLK_OUT and the data signal line driver circuit control signal Ssc provided by the timing generator 23, the drive/pause control circuit 21 generates and provides an amp enable signal AE to the data signal line driver circuit 310. The drive/pause control circuit 21 generates and provides an active amp enable signal AE to the data signal line driver circuit 310, thereby causing an analog amplifier (not shown) provided in the data signal line driver circuit 310 to operate during both the overshoot drive period and the data voltage writing period for pause drive. As a result, the data signal line driver circuit 310 applies the overshoot voltage and the data voltage sequentially to the data signal lines SL. During the pause period, an inactive amp enable signal AE is generated and provided to the data signal line driver circuit 310, so that the analog amplifier is paused. More specifically, in the case where the drive/pause control circuit 21 is provided with a dot clock selection signal SEL_DCLK which indicates that the image data DV has not yet been updated, the drive/pause control circuit 21 generates an amp enable signal AE which instructs to perform screen refresh by increasing the clock rate for the overshoot drive period and the data voltage writing period, and outputs the amp enable signal AE to the data signal line driver circuit 310 in order to perform pause drive. In this manner, the drive/pause control circuit 21 sets the overshoot drive period and the data voltage writing period to be shorter than a normal frame period.

On the other hand, in the case where the drive/pause control circuit 21 is provided with a dot clock selection signal SEL_DCLK which indicates that the image data DV has already been updated, the drive/pause control circuit 21 generates an amp enable signal AE which instructs to set only the data voltage writing period and further to perform screen refresh at a normal clock rate, and outputs the amp enable signal AE to the data signal line driver circuit 310. As a result, the liquid crystal display device 100 is driven by normal drive. In this manner, the drive/pause control circuit 21 is capable of outputting the amp enable signal AE for pause drive or normal drive to the data signal line driver circuit 310 in accordance with the input image data.

On the basis of the dot clock output signal DCLK_OUT and the data signal line driver circuit control signal Ssc provided by the timing generator 23, the polarity control circuit 22 generates a polarity control signal PC to invert the polarity of the image signal DS, and supplies the signal to the data signal line driver circuit 310. The data signal line driver circuit 310 sets the polarities of the overshoot voltage and the data voltage, which are to be applied to the data signal lines SL, to be positive or negative in accordance with the polarity control signal PC.

The scanning signal line driver circuit 320 sequentially selects and drives the scanning signal lines GL in accordance with the scanning signal line driver circuit control signal Sgc. In accordance with the data signal line driver circuit control signal Ssc, the dot clock output signal DCLK_OUT, the polarity control signal PC, and the amp enable signal AE, the data signal line driver circuit 310 converts the image signal DS outputted by the grayscale control portion 400 to a data voltage, which is an analog signal, and applies the data voltage to each data signal line SL. Moreover, the correction image signal DCS is converted to an overshoot voltage, and the overshoot voltage is applied to the data signal line SL. The overshoot voltage and the data voltage applied to the data signal lines SL are sequentially written to the pixel forming portions 10 connected to the scanning signal lines GL that have been selected by applying the active scanning signal. The period in which the data signal line driver circuit 310 can apply the data voltage or the overshoot voltage to the data signal lines SL as described above is only the period in which the data signal line driver circuit 310 is receiving an active amp enable signal AE from the drive/pause control circuit 21, and the polarities of the data voltage and the overshoot voltage to be applied to the data signal lines SL are determined by the polarity control signal PC.

Note that the data signal line driver circuit 310 may apply a ground potential to each data signal line SL during the pause period. This sets each data signal line at a fixed potential, so that an erroneous operation due to noise can be prevented. Alternatively, the operation of the data signal line driver circuit 310 may be stopped, thereby setting the data signal lines SL at a floating potential. This renders it possible to reduce power consumption in the data signal line driver circuit 310.

<2.3 Configuration of the Grayscale Control Portion>

The grayscale control portion 400 outputs a correction image signal DCS, which is obtained by performing a correction to emphasize a change on the image data DV transmitted by the host, or an image signal DS without correction, to the data signal line driver circuit 310. The configuration of such a grayscale control portion 400 will be described. As shown in FIG. 7, the grayscale control portion 400 includes the frame memory 31, a comparator circuit 32, an LUT 33, and an adder circuit 34. The frame memory 31 is capable of storing image data DV transmitted by the host, for one frame.

The comparator circuit 32 obtains a grayscale value (a current-frame grayscale value) for the image data DV and a grayscale value for the image signal DS stored in the frame memory 31 for an immediately preceding frame period (a previous-frame grayscale value), and provides the grayscale values to the LUT 33. As will be described later, the LUT 33 has a plurality of correction values stored therein corresponding to previous-frame grayscale values and current-frame grayscale values. When the LUT 33 as above is provided with a previous-frame grayscale value and a current-frame grayscale value from the comparator circuit 32, the LUT 33 reads and provides a correction value that corresponds to the values to the adder circuit 34.

Furthermore, the comparator circuit 32 obtains a current-frame grayscale value based on current-frame image data DV and a previous-frame grayscale value based on previous-frame image data DV stored in the frame memory 31, and compares the grayscale values. When the grayscale values are determined to be equal, the comparator circuit 32 considers the image to not have been updated, and notifies the display control portion 200 to perform pause drive. To this end, the comparator circuit 32 generates a dot clock selection signal SEL_DCLK which indicates that the second dot clock signal DCLK_B, which increases the clock rate of the drive period, should be selected, and provides the generated signal to the drive/pause control circuit 21 and the selector 26 in the display control portion 200.

Furthermore, in the case where the grayscale values are not determined to be equal, the comparator circuit 32 considers the image to have been updated, and notifies the display control portion 200 to perform normal drive. To this end, the comparator circuit 32 generates a dot clock selection signal SEL_DCLK which indicates that the first dot clock signal DCLK_A should be selected, and provides the generated signal to the drive/pause control circuit 21 and the selector 26 in the display control portion 200.

The adder circuit 34 is connected to the frame memory 31 and the LUT 33, and is supplied with image data DV stored in the frame memory 31. In the case where overshoot drive is performed, the adder circuit 34 generates a correction image signal DCS by adding a correction value provided by the LUT 33 to a current-frame grayscale value provided by the frame memory 31, and outputs the signal to the data signal line driver circuit 310. The data signal line driver circuit 310 performs D/A conversion on the correction image signal DCS to obtain an overshoot voltage, and applies the voltage to the data signal lines SL. Moreover, in the case where a data voltage is applied to the data signal lines SL, the image data DV stored in the frame memory 31 is supplied to the adder circuit 34 directly from the frame memory 31. The adder circuit 34 outputs the image data DV provided by the frame memory 31 to the data signal line driver circuit 310 as an image signal DS.

As described earlier, the dot clock output signal DCLK_OUT outputted by the timing generator 23 is supplied not only to circuits such as the data signal line driver circuit 310 but also to the frame memory 31. Accordingly, in the case where pause drive is performed, the image data DV stored in the frame memory 31 is supplied to the comparator circuit 32 and the adder circuit 34 at a high clock rate, so that the duration of each of the overshoot period and the data voltage writing period can be shortened.

FIG. 9 is a diagram illustrating an example of the configuration of the LUT 33 used in the liquid crystal display device 100 according to the present embodiment. As shown in FIG. 9, the LUT 33 has correction values for emphasizing a temporal change of image data DV stored therein corresponding to combinations of previous-frame grayscale values and current-frame grayscale values. For example, in the case where the previous-frame grayscale value is 32, and the current-frame grayscale value is 160, their corresponding correction value in the LUT 70 is 6. Accordingly, the adder circuit 34 adds the correction value to the image data DV, thereby generating a correction image signal DCS. Note that in the case where the previous-frame grayscale value and the current-frame grayscale value are not listed in the LUT 33, a correction value stored in the LUT 33 for the closest grayscale values is used to obtain a correction value through interpolation.

<2.4 Drive Method>

From the results of the first and second basic studies, it can be appreciated that the occurrence of flicker due to flexoelectric polarization can be suppressed by writing an image signal DS that corresponds to a target grayscale value to the pixel forming portions 10 after performing overshoot drive such that the "positive effective area" and the "negative effective area" are approximately equal in size.

Figure 10:
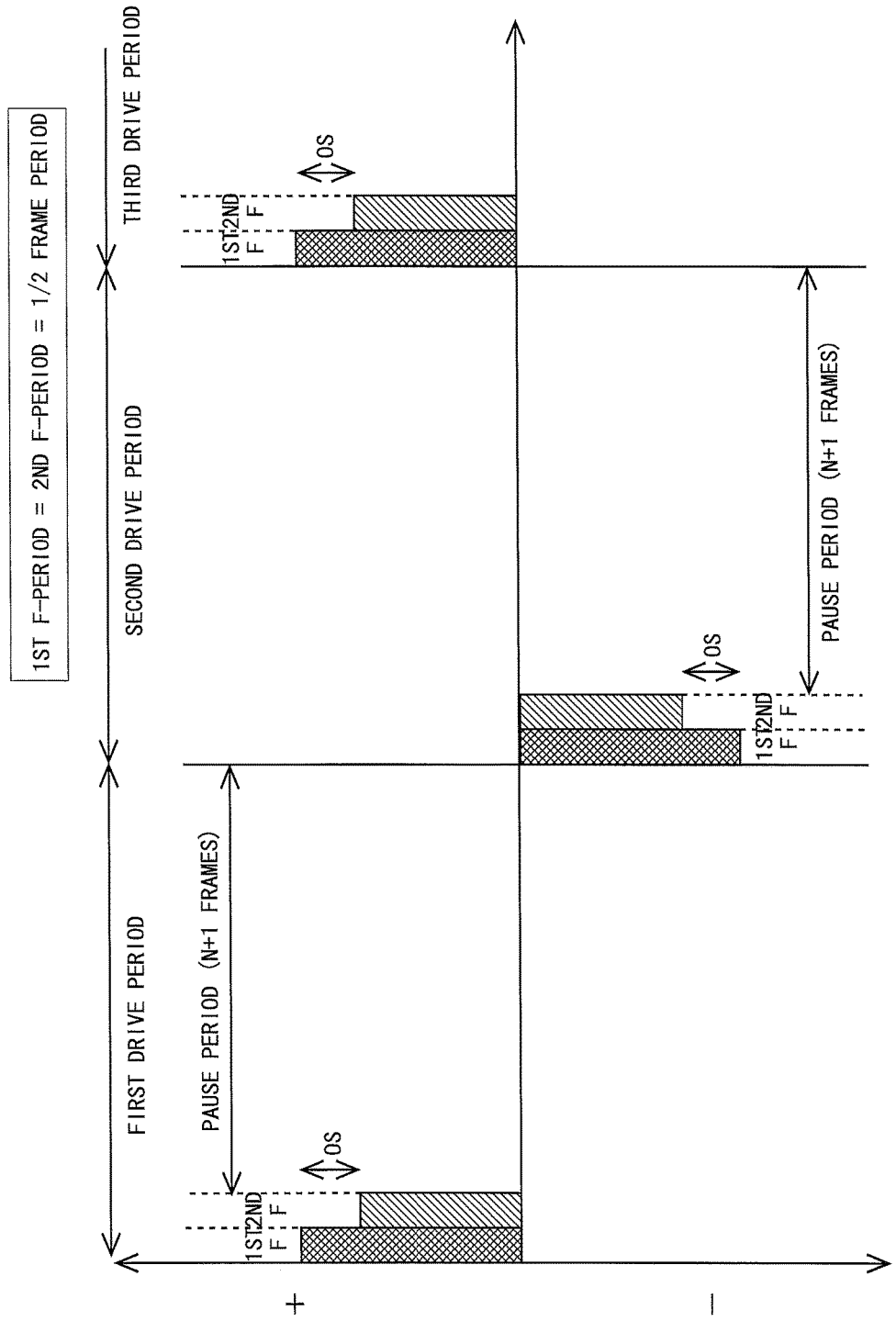
FIG. 10 is a timing chart illustrating a method for driving the liquid crystal display device shown in FIG. 7.

FIG. 10 is a timing chart illustrating a method for driving the liquid crystal display device 100 according to the present embodiment. In a first drive period, as in the case shown in FIG. 4, the liquid crystal display device 100 writes a positive overshoot voltage during a first frame period and a positive data voltage during a second frame period. Thereafter, to maintain the positive data voltage written during the second frame period, (N+1) pause frame periods are inserted to set a pause period.

In a second drive period, a negative overshoot voltage is written during a first frame period, and a negative data voltage is written during a second frame period. Thereafter, to maintain the negative data voltage written during the second frame period, (N+1) pause frame periods are inserted to set a pause period. Similarly, in each subsequent odd drive period, a positive overshoot voltage is written during a first frame period, and a positive data voltage is written during a second frame period. The second frame period is followed by a pause period to continue to maintain the positive data voltage written during the second frame period. Moreover, in each subsequent even drive period, a negative overshoot voltage is written during a first frame period, and a negative data voltage is written during a second frame period. The second frame period is followed by a pause period to continue to maintain the negative data voltage written during the second frame period.

In this case, unlike in the case shown in FIG. 4, the duration of each of the first and second frame periods of each drive period is set shorter than a normal frame period, e.g., a half of the normal frame period (referred to below as a "½ frame period"), and the duration of the following pause frame period is set to be the same as the normal frame period.

Figure 11:
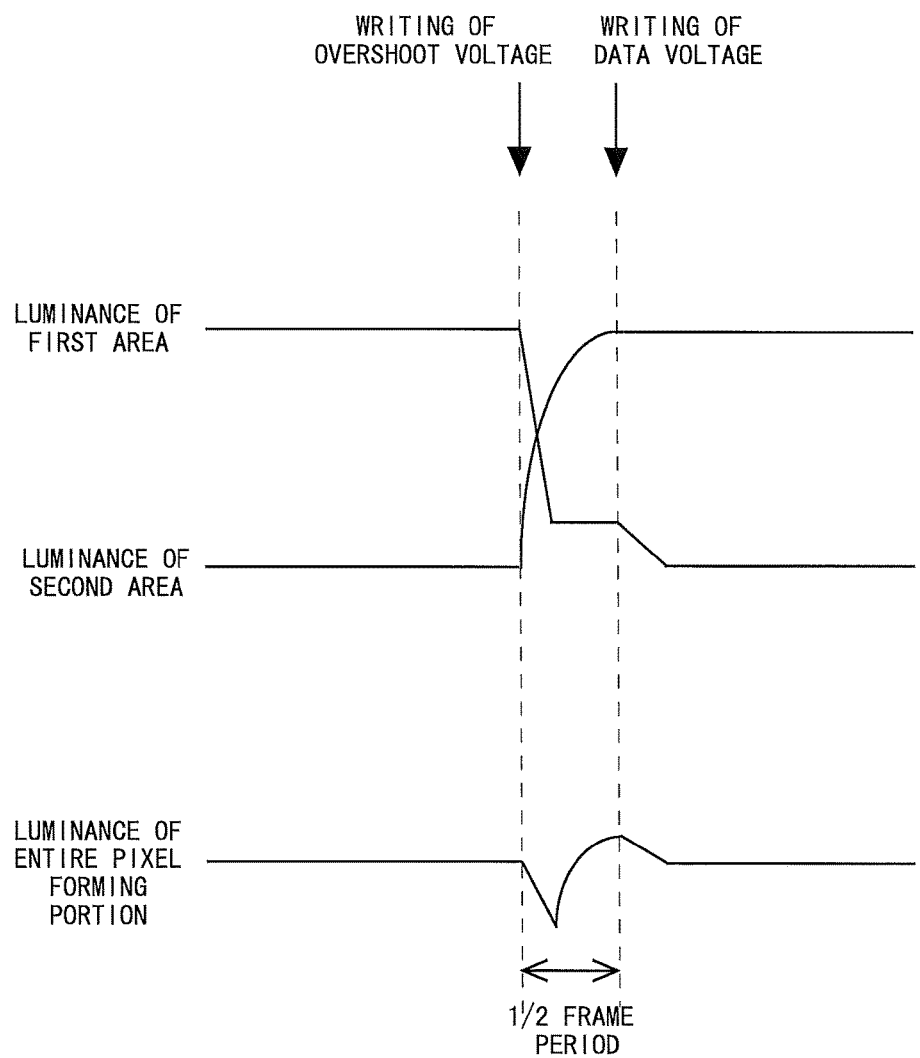
FIG. 11 is a diagram illustrating luminance changes within a pixel forming portion when the polarity of an image signal changes from positive to negative in the method for driving the liquid crystal display device shown in FIG. 7.

FIG. 11 is a diagram illustrating luminance changes within a pixel forming portion 10 when the polarity of a data voltage changes from positive to negative in the drive method of the present embodiment. The overshoot period is set at a ½ frame period, as shown in FIG. 11. In this manner, immediately before a data voltage corresponding to an image signal DS is written in the pixel forming portion 10, an overshoot voltage corresponding to a grayscale value higher than the grayscale value of the image signal DS is written, so that luminance can be inhibited from dropping significantly, immediately after the polarity of the data voltage is inverted. Moreover, the period of writing the overshoot voltage is set shorter than a normal frame period, so that the first frame period transitions to the next, i.e., second, frame period without an excessive rise in luminance.

Figure 12:
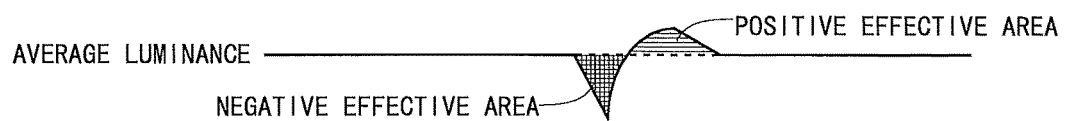
FIG. 12 is a diagram describing the occurrence of flicker being suppressed by the method for driving the liquid crystal display device shown in FIG. 7.

FIG. 12 is a diagram describing the occurrence of flicker being suppressed where drive is performed by the drive method shown in FIG. 10. As shown in FIG. 12, overshoot drive is performed during the first frame period, so that luminance is inhibited from abruptly dropping immediately after a polarity change. Moreover, unlike in the case shown in FIG. 6, the size of the "positive effective area" is reduced to approximately the same size as the "negative effective area", so that the occurrence of flicker due to flexoelectric polarization is suppressed.

Addressed next is about an appropriate duration of the first frame period. In the drive method of the present embodiment, the duration of the first frame period of each drive period in which overshoot drive is performed is set to be a half of a normal frame period, which is 16.7 milliseconds, i.e., a ½ frame period. Moreover, the duration of a pause frame period is set to be 16.7 milliseconds, which is the duration of the normal frame period. Accordingly, the pause period shown in FIG. 10 lasts for (N+1) frame periods, and therefore is longer by one frame than the pause period shown in FIG. 4, which lasts for N frame periods.

Furthermore, the duration of the second frame period in each drive period is preferably a ½ frame period, that is, the same as the duration of the first frame period. Accordingly, for any pixel forming portions 10 within one screen, it is possible to render constant the time taken from the writing of an overshoot voltage to the writing of a data voltage, i.e., the time taken from the start to the end of the writing of the overshoot voltage. As a result, the size of the "positive effective area" is the same among the pixel forming portions 10, so that uneven flicker distribution can be inhibited. However, in the case where it is not necessary to inhibit uneven flicker distribution within one screen, the duration of the second frame period may be set to be different from the duration of the first frame period.

Discussed next is the duration of the first frame period. If the duration of the first frame period is set to be greater than or equal to a normal frame period, the overshoot voltage to be written to each pixel forming portion becomes excessively high. As a result, the size of the "positive effective area" becomes considerably larger than the size of the "negative effective area", so that flicker due to flexoelectric polarization becomes more likely to occur. Therefore, it is necessary to set the duration of the overshoot drive period less than one frame period.

Furthermore, if the duration of the first frame period is excessively short, the TFT 11 of each pixel forming portion 10 is turned off before a sufficient overshoot voltage is written in the pixel forming portion 10. As a result, the absolute value of the overshoot voltage that is to be written in the pixel forming portion 10 becomes low. Accordingly, the size of the "positive effective area" becomes smaller than the size of the "negative effective area", so that flicker due to flexoelectric polarization becomes more likely to occur.

Therefore, the inventors conducted a series of studies on the above issues, and found that the period of applying an overshoot voltage is set preferably to be greater than or equal to a ¼ frame period for the following reasons. Specifically, it was found that in the case of a display with a vertical resolution of 2048, to write 99% of the value of the voltage applied to the data signal line SL to the pixel forming portion 10, the charging time (i.e., the duration of one horizontal period) is required to be at least 2.0 microseconds. Therefore, the time required for writing an overshoot voltage to the pixel forming portions 10 for one screen can be obtained by the following equation (1).

$$2.0\ (\text{microseconds}) \times 2048/100 \approx 4.2\ (\text{milliseconds}) \quad (1)$$

The value 4.2 milliseconds obtained by equation (1) is about a quarter of the duration of a normal frame period, i.e., 16.7 milliseconds. From the above, it was found that in the present embodiment, to inhibit the occurrence of flicker due to flexoelectric polarization, the duration of a frame period in which to apply an overshoot voltage is required to be at least a ¼ frame period.

From the above results, it was found that in the present invention, the duration of each of the first and second frame periods in each drive period is required to be less than one frame period but greater than or equal to a ¼ frame period.

<2.5 Effects>

In the present embodiment, overshoot drive is performed during the first frame period of each drive period. In this overshoot drive, the duration of the first frame period in which the overshoot voltage is applied is set to be a period greater than or equal to a quarter of a normal frame period but less than a normal frame period. Thus, the "positive effective area" and the "negative effective area" are approximately equalized in size, so that the occurrence of flicker due to flexoelectric polarization can be suppressed.

Furthermore, in the case where overshoot drive is performed during the first frame period, and the data voltage is written in the pixel forming portion 10 during the next, i.e., second, frame period, the duration of the second frame period is preferably set to be the same as the duration of the first frame period. This renders it possible to suppress the occurrence of flicker due to flexoelectric polarization uniformly among the pixel forming portions 10.

<2.6 First Variant>

Figure 13:
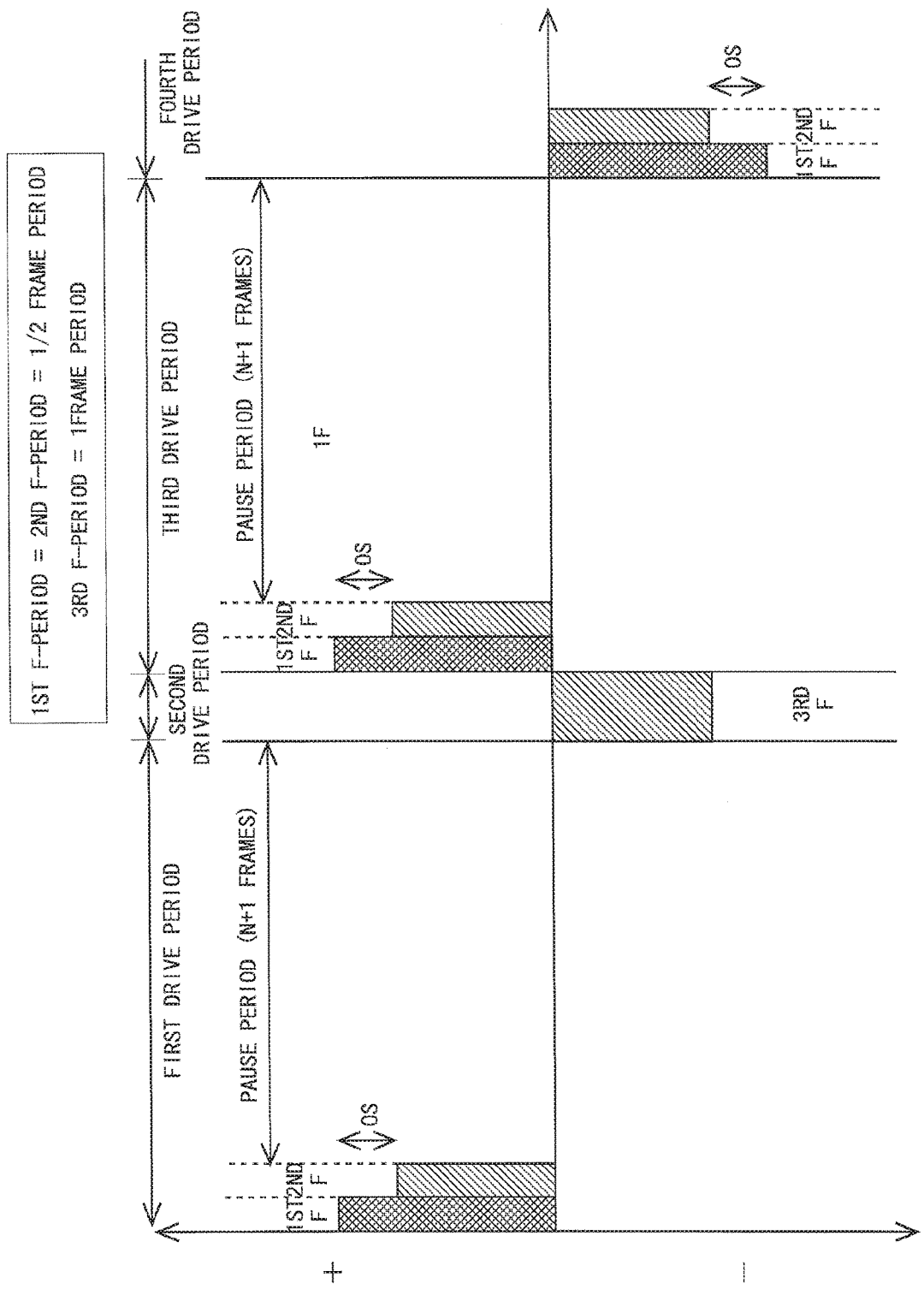
FIG. 13 is a timing chart illustrating a method for driving a liquid crystal display device according to a first variant of the first embodiment.

In the above embodiment, when the previous-frame grayscale value and the current-frame grayscale value are not equal, normal drive is performed. However, there might be a case where the previous-frame grayscale value and the current-frame grayscale value are not equal when pause drive is being performed. FIG. 13 is a timing chart illustrating a method for driving the liquid crystal display device according to a first variant of the present embodiment.

As in the case shown in FIG. 10, the previous-frame grayscale value and the current-frame grayscale value are equal during the first drive period. Accordingly, first and second frame periods are set such that each frame period has a duration of a ½ frame period, a positive overshoot voltage is written during the first frame period, and a positive data voltage is written during the second frame period. Thereafter, to maintain the positive data voltage written during the second frame period, (N+1) pause frame periods are inserted to set a pause period.

However, during the second drive period, the previous-frame grayscale value and the current-frame grayscale value are different. Accordingly, to perform normal drive, a third frame period (third F-period), which has the same duration as a normal frame period, is set, and a negative data voltage is written during the third frame period.

During the third drive period, as in the case of the first drive period, the previous-frame grayscale value and the current-frame grayscale value are equal, and therefore, pause drive is performed again as in the first drive period. Thereafter, the following will be repeated: when the previous-frame grayscale value and the current-frame grayscale value are equal, pause drive is performed, and when the previous-frame grayscale value and the current-frame grayscale value are different, normal drive is performed. Thus, in the case of the pause drive described in the present variant, the "positive effective area" and the "negative effective area" are approximately equalized in size, so that the occurrence of flicker due to flexoelectric polarization can be suppressed.

<2.7 Second Variant>

In the above embodiment, before screen refresh is performed using a data voltage corresponding to image data, overshoot drive is performed by applying an overshoot voltage higher than the data voltage. However, in some cases, instead of performing overshoot drive, it might be preferable to perform undershoot drive by applying an undershoot voltage lower than the data voltage. In the case of such undershoot drive also, the "positive effective area" and the "negative effective area" are approximately equalized in size, and to this end, an undershoot period is set to be shorter than a normal frame period. This renders it possible to suppress the occurrence of flicker due to flexoelectric polarization uniformly among the pixel forming portions 10. In this case, when undershoot drive is performed, the adder circuit 34 generates a correction image signal DCS by subtracting a correction value provided by the LUT 33 from a current-frame grayscale value provided by the frame memory 31.

Note that the process of generating a correction image signal DCS by adding/subtracting the correction value provided by the LUT 33 to/from the current-frame grayscale value provided by the frame memory 31 will also be referred to as a "grayscale correction process", and the overshoot voltage and the undershoot voltage will also be referred to as "grayscale correction voltages".

<3. Second Embodiment>

If the ambient temperature around the liquid crystal display device 100 changes, there occur changes not only in alignment deformation caused by dielectric anisotropy but also in alignment deformation caused by flexoelectric polarization. For example, if overshoot drive is performed at low temperature using an LUT storing correction values that have been set at normal temperature, the response speed of liquid crystals is slow at low temperature, and is not increased sufficiently. As a result, it becomes difficult to make adjustments within a period shorter than one frame period, such that the size of the "positive effective area" and the size of the "negative effective area" become approximately the same. On the other hand, if overshoot drive is performed at high temperature under the same conditions as at normal temperature, image luminance becomes excessively high because the response speed of liquid crystals is fast at high temperature, so that the size of the "positive effective area" becomes excessively large. In this manner, regardless of whether the ambient temperature is high or low, the "positive effective area" and the "negative effective area" do not balance each other in terms of size, and therefore, flicker due to flexoelectric polarization becomes more likely to occur. Therefore, the liquid crystal display device 100 to be used in a wide range of temperatures preferably has a plurality of LUTs for different temperature ranges so that optimum overshoot drive can be performed by adding an optimum correction value in accordance with the temperature.

<3.1 Configuration of the Liquid Crystal Display Device>

Figure 14:
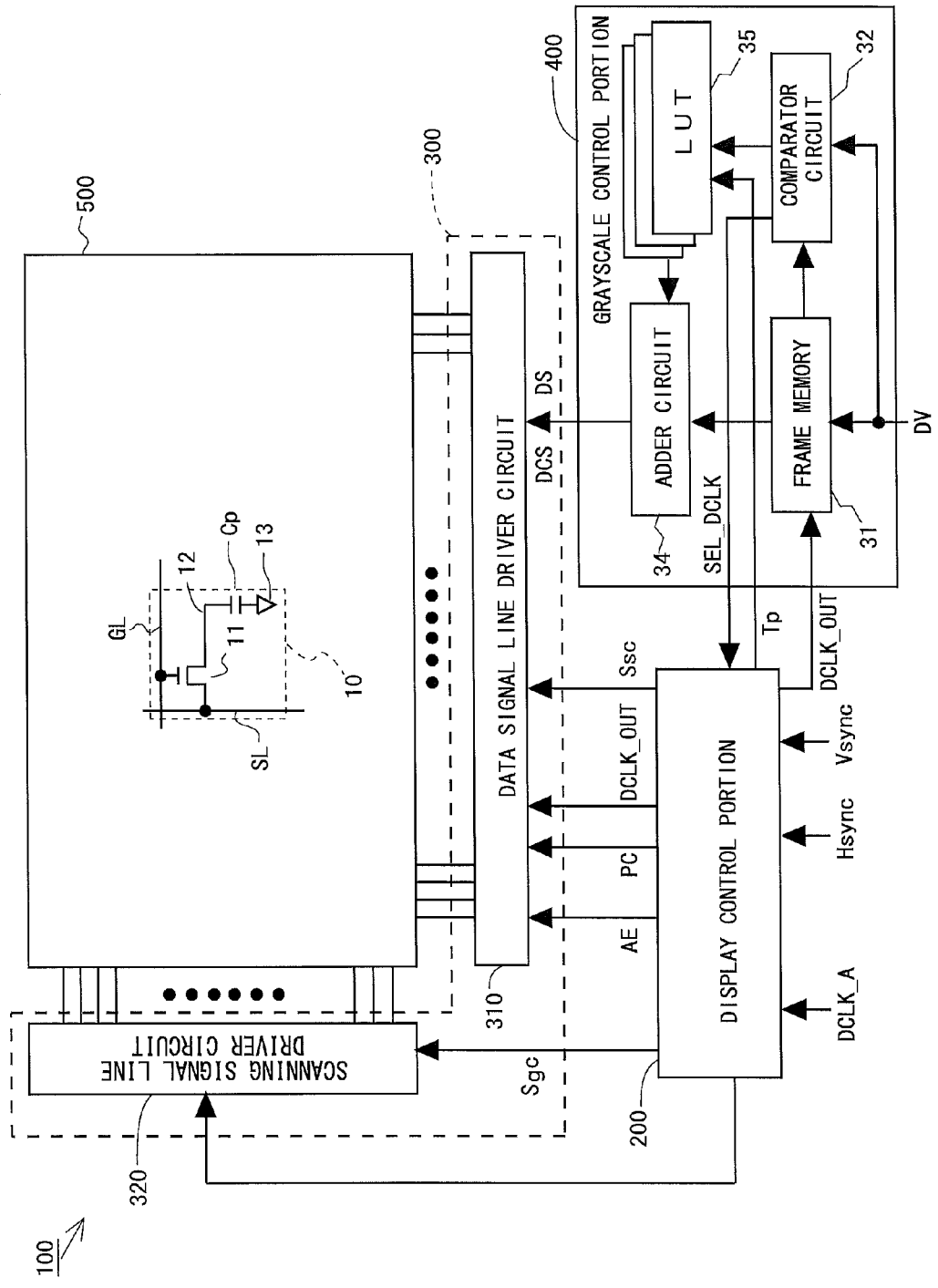
FIG. 14 is a block diagram illustrating the configuration of a liquid crystal display device according to a second embodiment of the present invention.
Figure 15:
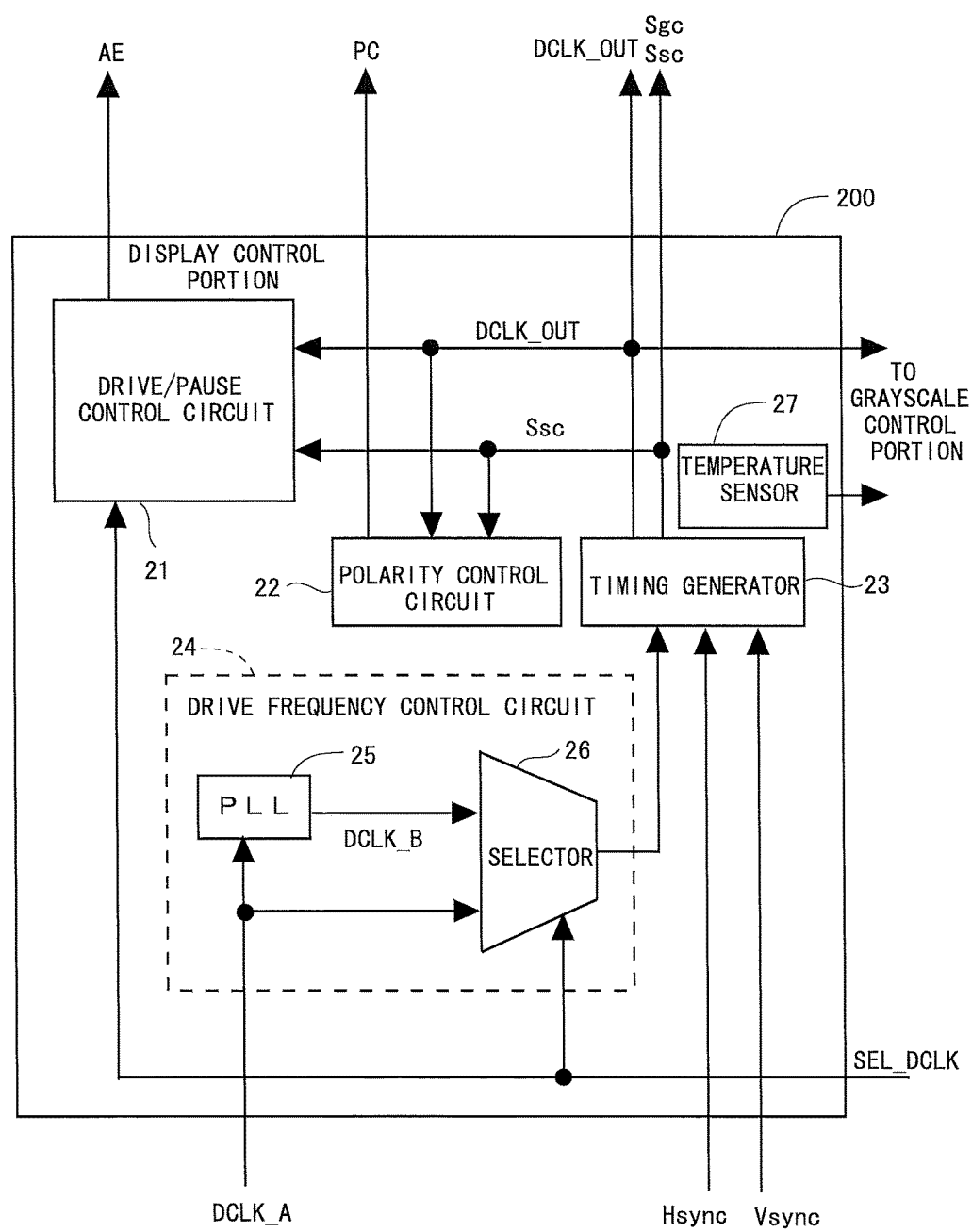
FIG. 15 is a block diagram illustrating the configuration of a display control portion included in the liquid crystal display device shown in FIG. 14.

FIG. 14 is a block diagram illustrating the configuration of the liquid crystal display device 100 according to the present embodiment, and FIG. 15 is a block diagram illustrating the configuration of a display control portion 200 included in the liquid crystal display device 100 shown in FIG. 14. In the liquid crystal display device 100 shown in FIGS. 14 and 15, unlike in the liquid crystal display device 100 shown in FIG. 7, the display control portion 200 is provided with a temperature sensor 27, and the grayscale control portion 400 has three LUTs 35a to 35c provided for different temperature ranges. Note that the components shown in FIGS. 14 and 15 that are the same as those shown in FIGS. 7 and 8 are denoted by the same reference characters, any descriptions thereof will be omitted, and different components will be described mainly.

FIG. 16 is a diagram showing an example of the LUT 35a for normal temperature used in the liquid crystal display device 100, FIG. 17 is a diagram showing an example of the LUT 35b for high temperature, and FIG. 18 is a diagram showing an example of the LUT 35c for low temperature. As can be appreciated from FIGS. 16 to 18, correction values are set so as to be lower in the order: the LUT 35c for low temperature; the LUT 35a for normal temperature; the LUT 35b for high temperature. By using the LUTs 35a to 35c, the overshoot voltage is set higher for low temperature at which the response speed of liquid crystals is slow, than for normal temperature, and also lower for high temperature than for normal temperature.

The LUTs 35a to 35c provided for their respective temperature ranges are also referred to as subtables. Moreover, the number of LUTs provided for their respective temperature ranges is not limited to three, and may be provided in a larger or smaller number in accordance with the purpose of use of the liquid crystal display device.

In this manner, the LUTs to be used are changed in accordance with the temperature at which the liquid crystal display device 100 is used, and therefore, it is necessary to provide the temperature sensor 27 in order to obtain temperature information Tp about the environment in which the liquid crystal display device 100 is used. In the present embodiment, the temperature sensor 27 is provided in the display control portion 200, and one of the LUTs 35a to 35c is selected on the basis of the temperature information Tp from the temperature sensor 27.

Furthermore, although the temperature sensor 27 has been described as being provided in the display control portion 200, the temperature sensor 27 may be provided on the display portion 500 independently of the display control portion 200. In this case, the display control portion 200 acquires temperature information Tp from the temperature sensor 27 via serial communication, and selects one of the LUTs 35a to 35c in accordance with the temperature information Tp. Note that in the case where the temperature sensor 27 is provided on the insulating substrate, and transmits the temperature information Tp to the display control portion 200 via serial communication, the temperature sensor 27 can be provided in an arbitrary position on the insulating substrate. Moreover, in the case where the temperature sensor 27 is provided in the display control portion 200, the circuit configuration of the display control portion 200 does not become complex. This renders it possible to reduce production cost of the liquid crystal display device 100.

<3.2 Effects>

In the present embodiment, overshoot drive is performed by selecting one of the LUTs 35a to 35c in accordance with temperature information Tp measured by the temperature sensor 27 in the environment in which the liquid crystal display device 100 is used, and therefore, the "positive effective area" and the "negative effective area" can be approximately equalized in size regardless of the temperature of the use environment. In this manner, the occurrence of flicker due to flexoelectric polarization can be suppressed even in the liquid crystal display device 100 to be used in a wide temperature range.

<4. Others>

Each of the above embodiments has been described with respect to the liquid crystal display device 100 driven in the transverse electric field mode, but the present invention can also be applied to liquid crystal display devices driven in the vertical electric field mode.

Furthermore, the inversion drive for the liquid crystal display device according to each of the above embodiments can be applied to any of the following alternating-voltage drive modes: dot-by-dot inversion drive, line-by-line inversion drive, column-by-column inversion drive, and frame-by-frame inversion drive, and can achieve effects similar to those achieved by the embodiments.

INDUSTRIAL APPLICABILITY

The present invention is applied to liquid crystal display devices in which alternating-voltage drive is performed, particularly to a liquid crystal display device in which drive in a transverse electric field mode or pause drive is performed.

DESCRIPTION OF THE REFERENCE CHARACTERS 10 pixel forming portion
11 thin-film transistor (TFT)
11a channel layer (semiconductor layer)
12 pixel electrode
12s opening (slit)
13 common electrode
16 insulating film
18 alignment film
21 drive/pause control circuit 22 polarity control circuit
23 timing generator
24 drive frequency control circuit
25 PLL circuit
26 selector
27 temperature sensor
31 frame memory
32 comparator circuit
33, 35 look-up table (LUT)
35a look-up table (subtable) for normal temperature
35b look-up table (subtable) for high temperature
35c look-up table (subtable) for low temperature
34 adder circuit
40 grayscale control portion
50 adder circuit
100 liquid crystal display device
200 display control portion
310 data signal line driver circuit
320 scanning signal line driver circuit
400 grayscale control portion
500 display portion
Cp pixel capacitor
GL scanning signal line
SL data signal line
CS common line
DV image data (input image data)
DS image signal
DCS correction image signal
P1 first area
P2 second area
Tp temperature information

The invention claimed is:

1. A liquid crystal display device performing alternating-voltage drive, comprising:
   a plurality of scanning signal lines formed on an insulating substrate;
   a plurality of data signal lines crossing each of the scanning signal lines;
   a plurality of pixel forming portions formed at respective intersections of the scanning signal lines and the data signal lines;
   a grayscale control portion configured to output either a correction image signal or an image signal, the correction image signal being obtained by subjecting input image data to a grayscale correction process for correcting a temporal signal change, the image signal being the input image data that is not subjected to the grayscale correction process;
   a scanning signal line driver circuit configured to sequentially select and scan the scanning signal lines;
   a data signal line driver circuit configured to apply either a data voltage or a grayscale correction voltage to the data signal lines, the data voltage being generated in accordance with the image signal and corresponding to a target grayscale value, the grayscale correction voltage being generated by correcting the data voltage in accordance with the correction image signal; and
   a display control portion configured to control the scanning signal line driver circuit and the data signal line driver circuit, wherein,
   the display control portion writes the grayscale correction voltage to the pixel forming portions during a first frame period, as well as the data voltage having the same polarity as the grayscale correction voltage during a second frame period, thereby performing control such that screen refresh is performed,
   the first frame period has a duration greater than or equal to a quarter of a frame period at a refresh rate of 60 Hz but less than the frame period,
   the grayscale control portion includes:
      a frame memory having stored the input image data for each frame;
      a table having, correction values stored corresponding to previous-frame grayscale values and current-frame grayscale values for the input image data;
      a comparator circuit configured to obtain a current-frame grayscale value for the input image data and a previous-frame grayscale value for the input image data stored in the frame memory, and output the obtained values to the table; and
      an adder circuit configured to output either the correction image signal or the image signal to the data signal line driver circuit in accordance with the input image data,
   the table has the correction values stored corresponding to combinations of the current-frame grayscale values and the previous-frame grayscale values for the input image data, and outputs a corresponding correction value from among the combinations to the adder circuit when the comparator circuit provides the table with a current-frame grayscale value and a previous-frame grayscale value for the input image data, and
   the adder circuit outputs the correction image signal after correcting the grayscale for the input image data with the correction value provided by the table, or outputs the image signal without correcting the grayscale value for the input image data.

2. The liquid crystal display device according to claim 1, wherein the second frame period has the same duration as the first frame period.

3. The liquid crystal display device according to claim 1, wherein the display control portion sets a pause period upon completion of the writing of the data voltage to the pixel forming portions during the second frame period, whereby the writing of the data voltage to the pixel forming portions is paused.

4. The liquid crystal display device according to claim 1, wherein the display control portion includes a drive frequency control circuit configured to, upon acquisition of update information from the comparator circuit indicating that the input image data has not yet been updated, adjust the duration of the first frame period to be less than the duration of the frame period on the basis of the update information.

5. The liquid crystal display device according to claim 4, wherein,
   the update information includes first update information and second update information, the first update information indicating that the input image data has not yet been updated, the second update information indicating that the input image data has been updated, and
   the display control portion further includes a drive/pause control circuit configured to generate a drive/pause control signal to switch between a drive period and a pause period when the first update information is provided by the comparator circuit or only set a data voltage writing period in which the data voltage is written when the second update information is provided, the drive period consisting of a grayscale correction period in which the grayscale correction voltage is written and the data voltage writing period.

6. The liquid crystal display device according to claim 1, further comprising a temperature sensor configured to measure an ambient temperature around the liquid crystal display device, wherein, the table includes a plurality of subtables having stored different correction values for predetermined temperature ranges, and the table selects from among the subtables one that corresponds to temperature information provided by the temperature sensor in accordance with the temperature information.

7. The liquid crystal display device according to claim 1, wherein the pixel forming portion includes a thin-film transistor being connected at a control terminal to the scanning signal line, at a first conductive terminal to the data signal line, and at a second conductive terminal to a pixel electrode to which the data voltage or the grayscale correction voltage is to be applied, the thin-film transistor having a channel layer formed with an oxide semiconductor.

8. The liquid crystal display device according to claim 7, wherein the oxide semiconductor includes indium, gallium, zinc, and oxygen.

9. The liquid crystal display device according to claim 3, wherein the data signal line driver circuit applies a ground potential to the data signal line during the pause period.

10. The liquid crystal display device according to claim 3, wherein the data signal line driver circuit sets the data signal line at a floating potential during the pause period.

11. The liquid crystal display device according to claim 1, wherein the insulating substrate has a common electrode and a pixel electrode formed thereon such that one electrode is superimposed over the other electrode with an insulating film positioned therebetween, the overlying electrode having a plurality of openings provided therein.

12. The liquid crystal display device according to claim 1, wherein alternating-voltage drive is performed in a dot-by-dot inversion drive mode, a line-by-line inversion drive mode, a column-by-column inversion drive mode, or a frame-by-frame inversion drive mode.

13. An alternating-voltage driving method for a liquid crystal display device configured to alternately repeat a refresh period for updating an image with an input image data and a pause period for pausing updating of the image, comprising:

a grayscale correction voltage application step for applying a grayscale correction voltage to a liquid crystal layer by writing the grayscale correction voltage to a pixel forming portion in case where a polarity of a data voltage is switched by being provided with updated image information indicating that the input image data is not updated during a time period having a duration greater than or equal to a quarter of a frame period at a refresh rate of 60 Hz;

a first data voltage application step for applying the data voltage to the liquid crystal layer by writing the data voltage to the pixel forming portion without subjecting the data voltage to the grayscale correction process;

a pause step of retaining the written first data voltage; and a second data voltage application step for applying the data voltage to the liquid crystal layer by writing the data voltage to the pixel forming portion without subjecting the data voltage to the grayscale correction process in the case where the polarity of the data voltage is switched by being provided with the updated image information indicating that the input image data is not updated during the period having the duration greater than or equal to the quarter of the frame period at a refresh rate of 60 Hz.

14. The method for driving a liquid crystal display device according to claim 13, wherein in the first data voltage application step, the data voltage is applied for a time period having a same duration as the time period in which the grayscale correction voltage is applied in the grayscale correction voltage application step.

* * * * *